(12) United States Patent
Oyama et al.

(10) Patent No.: US 8,836,720 B2
(45) Date of Patent: Sep. 16, 2014

(54) IMAGE PROCESSING APPARATUS AND IMAGE PROCESSING METHOD

(75) Inventors: Kenji Oyama, Tokyo (JP); Takuya Tsujimoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 832 days.

(21) Appl. No.: 12/575,738

(22) Filed: Oct. 8, 2009

(65) Prior Publication Data

US 2010/0091027 A1      Apr. 15, 2010

(30) Foreign Application Priority Data

Oct. 14, 2008  (JP) ................................. 2008-265710

(51) Int. Cl.
| | | |
|---|---|---|
| G09G 5/00 | (2006.01) | |
| G02B 27/14 | (2006.01) | |
| G02B 27/01 | (2006.01) | |
| G02B 27/00 | (2006.01) | |

(52) U.S. Cl.
CPC ........... *G02B 27/0068* (2013.01); *G02B 27/01* (2013.01); *G02B 2027/014* (2013.01); *G02B 27/0101* (2013.01); *G02B 2027/011* (2013.01)
USPC ............. 345/629; 359/16; 359/630; 359/637; 345/7; 345/8

(58) Field of Classification Search
USPC ...................... 345/629, 8, 7; 359/16, 630, 637
See application file for complete search history.

(56) References Cited

U.S. PATENT DOCUMENTS

| | | | | |
|---|---|---|---|---|
| 4,669,810 | A | * | 6/1987 | Wood ............................ 340/908 |
| 5,151,722 | A | * | 9/1992 | Massof et al. ................. 351/158 |
| 5,231,379 | A | * | 7/1993 | Wood et al. ........................ 345/9 |
| 5,302,964 | A | | 4/1994 | Lewins |
| 5,369,450 | A | * | 11/1994 | Haseltine et al. .............. 348/745 |
| 5,777,715 | A | * | 7/1998 | Kruegle et al. ................ 351/158 |
| 5,818,527 | A | * | 10/1998 | Yamaguchi et al. ........... 348/335 |
| 5,860,912 | A | * | 1/1999 | Chiba ............................ 600/111 |
| 5,903,395 | A | * | 5/1999 | Rallison et al. ................ 359/630 |
| 5,991,085 | A | * | 11/1999 | Rallison et al. ................ 359/630 |
| 6,104,405 | A | | 8/2000 | Idaszak et al. |
| 6,147,807 | A | * | 11/2000 | Droessler et al. .............. 359/637 |

(Continued)

FOREIGN PATENT DOCUMENTS

| | | |
|---|---|---|
| CN | 101166289 A | 4/2008 |
| DE | 10046019 A1 | 3/2002 |

(Continued)

OTHER PUBLICATIONS

Chinese Office Action dated Jun. 9, 2011 in corresponding Japanese Application No. 2009-10206546.1, and English translation.

(Continued)

*Primary Examiner* — M Good Johnson
(74) *Attorney, Agent, or Firm* — Fitzpatrick, Cella, Harper & Scinto

(57) ABSTRACT

Units which respectively acquire information on an aberration generated by a display optical system and information on an aberration generated by a vision correction optical system used by an observer are arranged. Aberration correction is executed based on the two aberrations. An aberration generated by a combination of the display optical system and the vision correction optical system used by the observer can be appropriately corrected for each observer.

30 Claims, 23 Drawing Sheets

(56) References Cited

U.S. PATENT DOCUMENTS

| | | | | |
|---|---|---|---|---|
| 6,338,559 B1* | 1/2002 | Williams et al. | ............... | 351/212 |
| 6,356,392 B1* | 3/2002 | Spitzer | ............... | 359/630 |
| 6,999,046 B2* | 2/2006 | Karstens | ............... | 345/7 |
| 7,031,071 B2* | 4/2006 | Nishioka | ............... | 359/676 |
| 7,458,683 B2* | 12/2008 | Chernyak | ............... | 351/205 |
| 7,997,731 B2* | 8/2011 | Dai | ............... | 351/211 |
| 8,035,576 B2* | 10/2011 | Ishino et al. | ............... | 345/8 |
| 8,116,008 B2* | 2/2012 | Prior et al. | ............... | 359/637 |
| 2002/0113940 A1 | 8/2002 | Fokuma et al. | ............... | 351/200 |
| 2004/0059444 A1* | 3/2004 | Tsukakoshi | ............... | 700/59 |
| 2004/0090683 A1* | 5/2004 | Nagata | ............... | 359/736 |
| 2005/0036038 A1 | 2/2005 | Wu et al. | | |
| 2007/0188633 A1 | 8/2007 | Mandy et al. | | |
| 2007/0226076 A1 | 9/2007 | Fokuma et al. | ............... | 705/26 |
| 2008/0062164 A1* | 3/2008 | Bassi et al. | ............... | 345/214 |
| 2008/0088527 A1 | 4/2008 | Fujimori et al. | | |
| 2009/0002574 A1* | 1/2009 | Sorek et al. | ............... | 348/784 |

FOREIGN PATENT DOCUMENTS

| | | |
|---|---|---|
| DE | 20304399 U1 | 6/2003 |
| JP | 6-018363 A | 1/1994 |
| JP | 2002-228545 A | 8/2002 |
| JP | 2006-135805 A | 5/2006 |
| JP | 2008-102518 A | 5/2008 |

OTHER PUBLICATIONS

European Search Report in European Application 09 17 3052.3, dated Jul. 26, 2010.

* cited by examiner

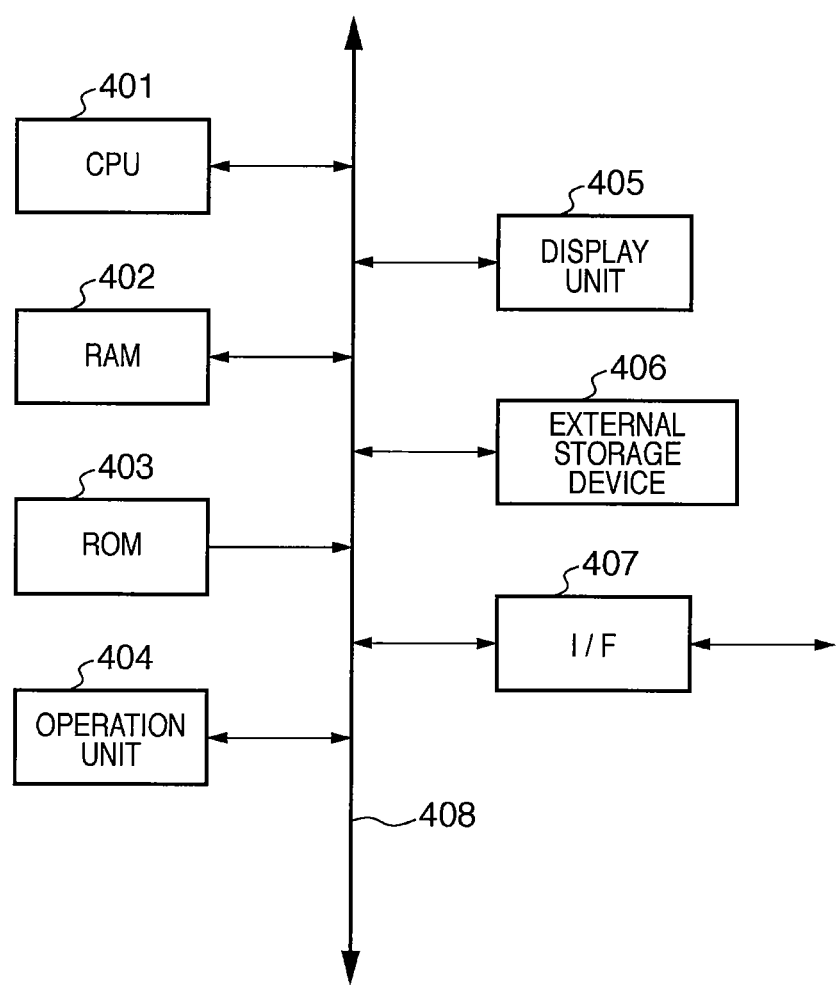
F I G. 4

—·—·— R
———— G
- - - - - B

F I G. 12A
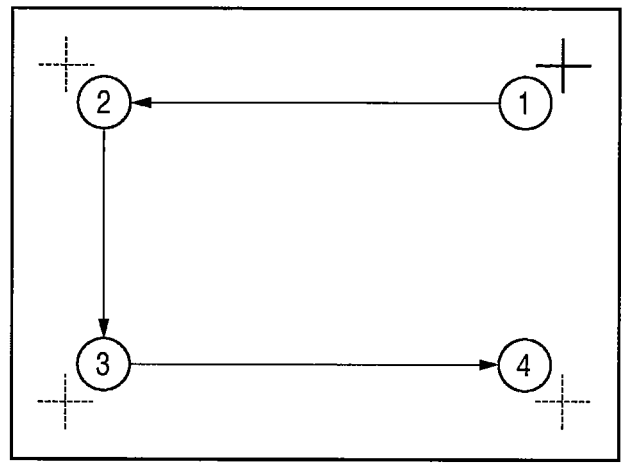
F I G. 12B
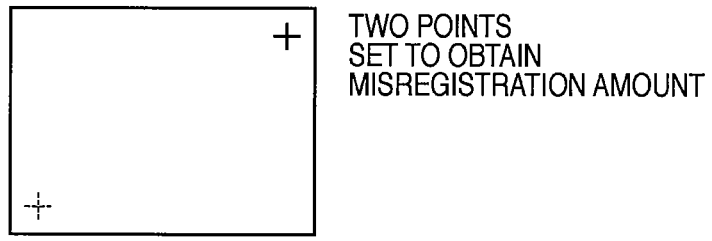
TWO POINTS
SET TO OBTAIN
MISREGISTRATION AMOUNT
F I G. 12C
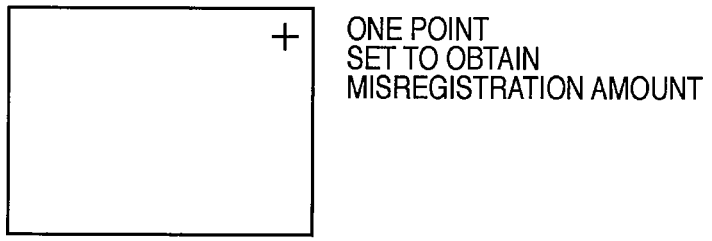
ONE POINT
SET TO OBTAIN
MISREGISTRATION AMOUNT

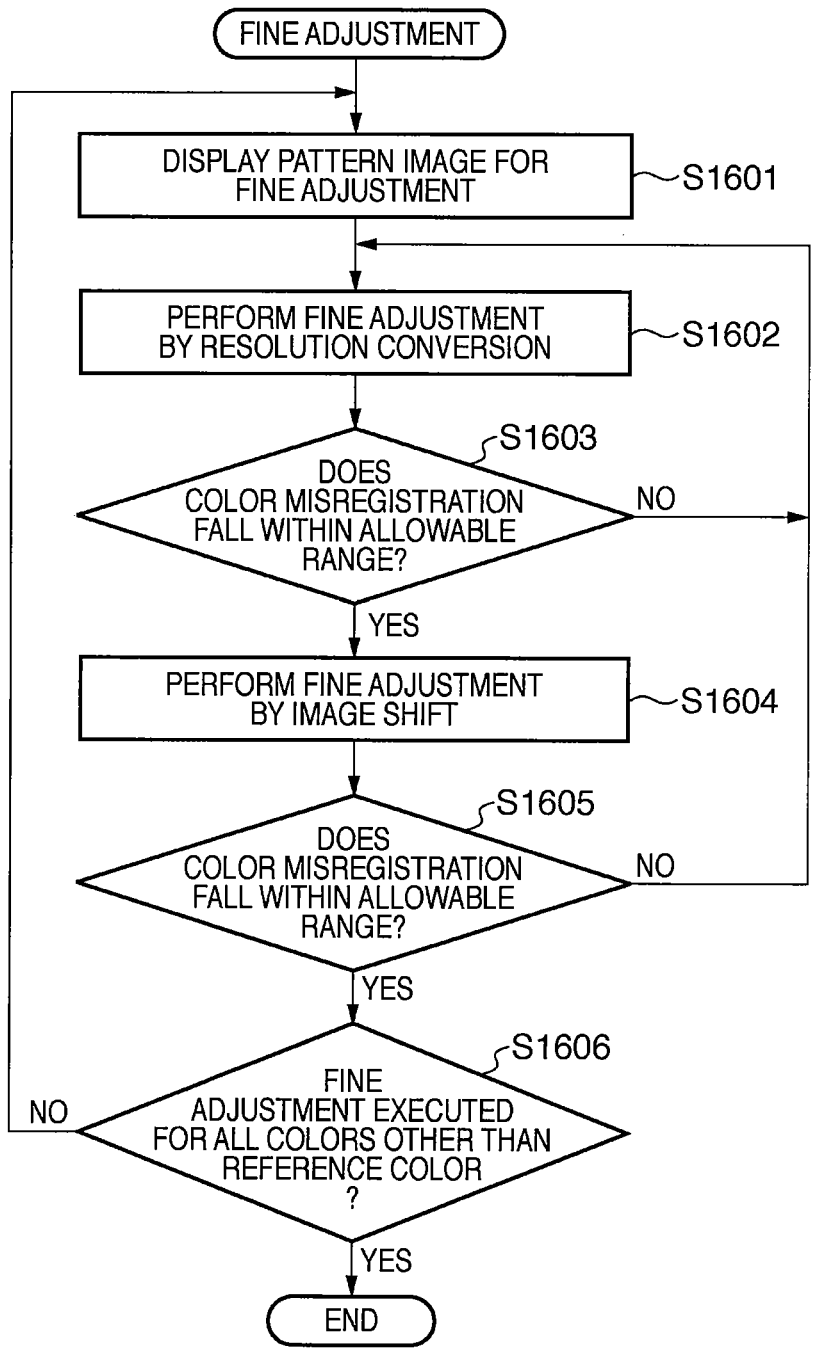

IMAGE PROCESSING APPARATUS AND IMAGE PROCESSING METHOD

BACKGROUND OF THE INVENTION

1. Field of the Invention

The present invention relates to an image processing apparatus. Particularly, the present invention is suitable to correct, for each observer, aberrations generated in an image display apparatus (e.g., HMD or EVF) having a display optical system which enlarges an image formed on a display device and allows an observer to observe the enlarged image.

2. Description of the Related Art

Many techniques have been proposed to digitally correct distortion of an image and color misregistration (bleeding) caused by aberrations generated by an optical lens. A lens for canceling aberrations is newly necessary to optically correct the distortion and color misregistration, increasing the size of the optical system. A lens with good optical characteristics designed to prevent these aberrations is generally expensive. Instead of such a lens, aberrations generated by an optical system are generally corrected by a digital aberration correction technique using image processing. This technique can downsize the optical system (decrease the number of lenses) and employ an inexpensive lens.

Recently, image capturing apparatuses such as digital cameras having more compact, lighter-weight, lower-cost main bodies require reductions in the size and cost of imaging lenses. Further, image capturing apparatuses such as digital cameras generally have zoom and focusing functions. Demand has arisen for a correction technique of maintaining a high image capturing quality regardless of a change of aberrations upon a change of lens parameters. Japanese Patent Laid-Open No. 2006-135805 (to be referred to as patent reference 1 hereafter) discloses an aberration correction technique capable of removing an image blur caused by chromatic aberration of magnification based on lens parameters even when an image is captured while the lens parameters including the zoom, focus, and iris are changed to various values. The technique disclosed in patent reference 1 can suppress degradation of the image capturing quality, i.e., an image blur by correcting chromatic aberration generated by the imaging lens upon a change of lens parameters in an image capturing apparatus such as a digital camera.

Many recent digital cameras include an electronic view finder (to be referred to as an EVF). The EVF is known as a technique of making an image confirmed via the viewfinder before image capturing truly match a captured image. The EVF adopts an arrangement using a digital image sensor to eliminate a reflex mirror (known as a reflector) indispensable for a single-lens reflex camera. The EVF is configured to display an image sensed by a digital image sensor in real time on a compact display device, enlarge the image formed on the display device via a display lens, and allow an observer to observe it.

The same aberrations as the above-mentioned ones of an imaging lens occur even in a display optical system which enlarges an image formed on a compact display device via a lens and allows an observer to observe it, like the EVF. This display optical system also requires an aberration correction technique of correcting degradation of the display image quality caused by distortion and color misregistration (bleeding).

A head mounted display (to be referred to as an HMD) is another example of the image display apparatus which enlarges an image formed on a compact display device and allows an observer to observe it. Many proposals have been made for a technique of applying a digital aberration correction technique to an HMD or EVF to prevent degradation of the display image quality caused by aberrations generated by the optical system of a display apparatus.

However, these conventional techniques suffer the following problems.

In addition to the display optical system of an HMD or EVF, another optical system may exist on an optical path through which light of an image formed on a display device reaches the pupil of an observer when he observes an image via the HMD or EVF.

For example, in aberration correction to correct only aberrations generated by the display optical system of the HMD or EVF, an aberration (color misregistration) is appropriately corrected for an observer who has good vision and can observe with his naked eyes. The observer can observe a display image maintaining the quality. However, when an observer who uses a powerful vision correction optical system observes the same corrected image, he observes the color misregistration even on the corrected image. This means that an appropriate aberration correction amount changes depending on whether the observer uses a vision correction optical system and the difference in the degree of vision correction.

That is, in observation via an HMD or EVF, generated aberrations need to be corrected in accordance with a combination of the display optical system of the HMD or EVF and a vision correction optical system used by an observer. However, the conventional techniques cannot meet this requirement.

The degree of correction by a vision correction optical system used by an observer changes for each observer. An appropriate aberration correction amount needs to be selected or generated for each observer when correcting aberrations generated by a combination of the display optical system and the vision correction optical system, as described above.

Optical systems used by HMD and EVF observers include vision correction optical systems (spectacle lenses and contact lenses). The degree of vision correction varies depending on the vision of each observer. There are known many methods for measuring the optical characteristics (e.g., refractivity, aberrations, and spatial distribution of them) of a vision correction optical system (mainly a spectacle lens), including a medical lens-meter used in for example, an eye clinic or by an optician. For example, Japanese Patent Laid-Open No. 06-018363 (to be referred to as patent reference 2) discloses a technique capable of measuring the refractivities of both spectacle lenses and contact lenses using only a single lens-meter. This technique adopts a moving means for moving a test lens along the optical axis when measuring a spectacle lens and measuring a contact lens. Japanese Patent Laid-Open No. 2002-228545 (to be referred to as patent reference 3) discloses a technique which uses a digital camera to capture the pattern image of an optical characteristic pattern observed via a lens and measure it as the optical characteristics of a frame-attached spectacle lens.

However, it is difficult to directly apply the above-mentioned conventional techniques to compact apparatuses such as an EVF and HMD to obtain optical characteristics including aberrations of a vision correction optical system. Hence, it is required to present a display image optimum for each observer by appropriately correcting aberrations generated by a combination of an optical system which allows an observer to observe an image formed on a display device, and a vision correction optical system used by the observer.

SUMMARY OF THE INVENTION

The present invention has been made to solve at least one of the conventional problems. Embodiments of the present invention provide an aberration correction method, image processing apparatus, and image processing system capable of performing aberration correction suited to each observer and presenting an aberration (color misregistration)-reduced display image in an image display apparatus having a display optical system which enlarges an image formed on a display device and allows an observer to observe it.

According to one aspect of the present invention, there is provided an image processing apparatus for determining observer-specific aberration correction data for correcting an aberration generated by an optical system for allowing an observer to observe a display image formed on a display, comprising:

a receiving unit for receiving aberration information relating to a vision correction optical system of the observer;

a determining unit for determining observer-specific aberration correction data using aberration correction data prepared in advance and the aberration information received by the receiving unit.

According to another aspect of the present invention, there is provided a method of determining observer-specific aberration correction data for correcting an aberration generated by an optical system for allowing an observer to observe a display image formed on a display, the method comprising the steps of:

receiving aberration information relating to a vision correction optical system of the observer;

determining observer-specific correction data using aberration correction data prepared in advance and the received aberration information.

Further features of the present invention will become apparent from the following description of exemplary embodiments with reference to the attached drawings.

BRIEF DESCRIPTION OF THE DRAWINGS

FIG. 4 is a block diagram exemplifying the hardware configuration of a computer applicable to an image processing apparatus in the first embodiment;

FIGS. 12A to 12C are schematic views for explaining a pattern image displayed when obtaining the amount of color misregistration in the first embodiment;

FIG. 16 is a flowchart showing fine adjustment processing in the first embodiment;

DESCRIPTION OF THE EMBODIMENTS

Preferred embodiments of the present invention will be described below with reference to the accompanying drawings.

First Embodiment

Figure 1:
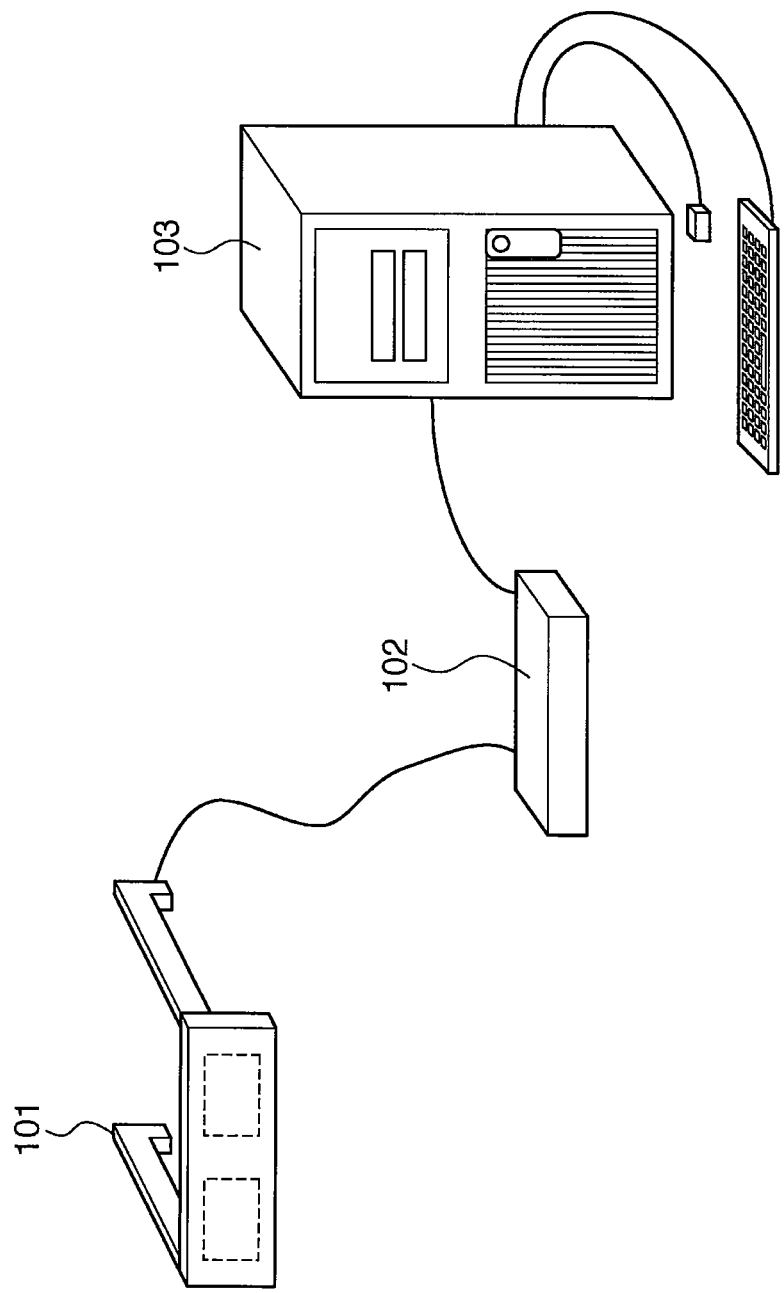
FIG. 1 is a view exemplifying the apparatus configuration of an image processing system using an HMD in the first embodiment.

FIG. 1 is a view exemplifying the configuration of an image processing system using an HMD in the first embodiment. The image processing system in the first embodiment may be a hand-held display apparatus, like binoculars, and an application of the present invention is not limited to a head mounted display.

The present invention is applicable to all display apparatuses each having an enlargement optical system which enlarges (as a virtual image) a display image formed on a display device and allows an observer to observe it. An example of these display apparatuses is an EVF attached to a digital camera or the like.

An image processing system using an HMD as an image display apparatus is superior to one using a general display in providing an observer with full immersion into an image and high realistic sensation. In recent years, a so-called mixed reality (to be referred to as MR) technique is known as an example of image processing systems using HMDs. This technique seamlessly blends physical and virtual worlds in real time.

An example of the MR system uses a video see-through HMD equipped with a video camera for capturing a space nearly matching the field of view observed from the pupil position of an HMD user. A computer graphics (to be referred to as CG) image is superimposed on an image captured by the video camera. The HMD user can experience an MR space as if an object (virtual object) rendered by CG existed in the physical world.

The HMD to be mounted on the head is preferably of low size and weight. To correct aberrations generated by image capturing and display optical systems, an optical method requires a correction lens and thus increases the size and weight in general. Instead of the optical method, aberration correction is done by a digital method using signal processing. In this case, the HMD can adopt an inexpensive lens, decrease the number of lenses, and achieve a smaller size and lighter weight.

An MR system according to the first embodiment includes an HMD 101, HMD controller 102 (to be referred to as a controller 102), and image processing apparatus 103.

The HMD 101 includes an image display unit for providing an output image from the image processing apparatus 103 to an HMD user. When the HMD 101 is a video see-through HMD in the MR system, it includes an image capturing unit which captures a scene observed by the HMD user. The HMD 101 displays a captured scene image, or a composite image obtained by superimposing a CG image on the scene image from the image processing apparatus 103.

The HMD 101 has a function of communicating with the controller 102. The HMD 101 can be driven by a voltage supplied from the controller 102 or a battery.

The image processing apparatus 103 connected to the controller 102 includes an image generating unit and/or an image playback unit which plays back video contents, which will be described with reference to FIG. 2. In the MR system, the image processing apparatus 103 has a CG rendering function of rendering a CG image by the image generating unit, and an image composition function of combining a physical space image captured by the HMD 101 and a CG image.

The image processing apparatus 103 communicates with the HMD 101 via the controller 102. Upon receiving an image from the image processing apparatus 103, the HMD 101 displays it on the image display unit to the HMD user. The controller 102 has functions for various image processes (e.g., image resolution conversion, color space conversion, and aberration correction of an optical system, which is a feature of the embodiment), and transmission format conversion.

In FIG. 1, the image processing apparatus 103 and controller 102 are formed from separate hardware structures. However, the functions of the controller 102 and image processing apparatus 103 may both be comprised in a dedicated image processing apparatus.

In FIG. 1, the HMD 101 and controller 102 are formed from separate hardware structures. However, the functions of the HMD 101 and controller 102 may be integrated. From a functional viewpoint, a combination of the functions of the HMD 101 and controller 102 will be explained as an HMD.

In FIG. 1, the respective apparatuses are connected by cables, but some or all of them may be connected wirelessly.

Figure 2:
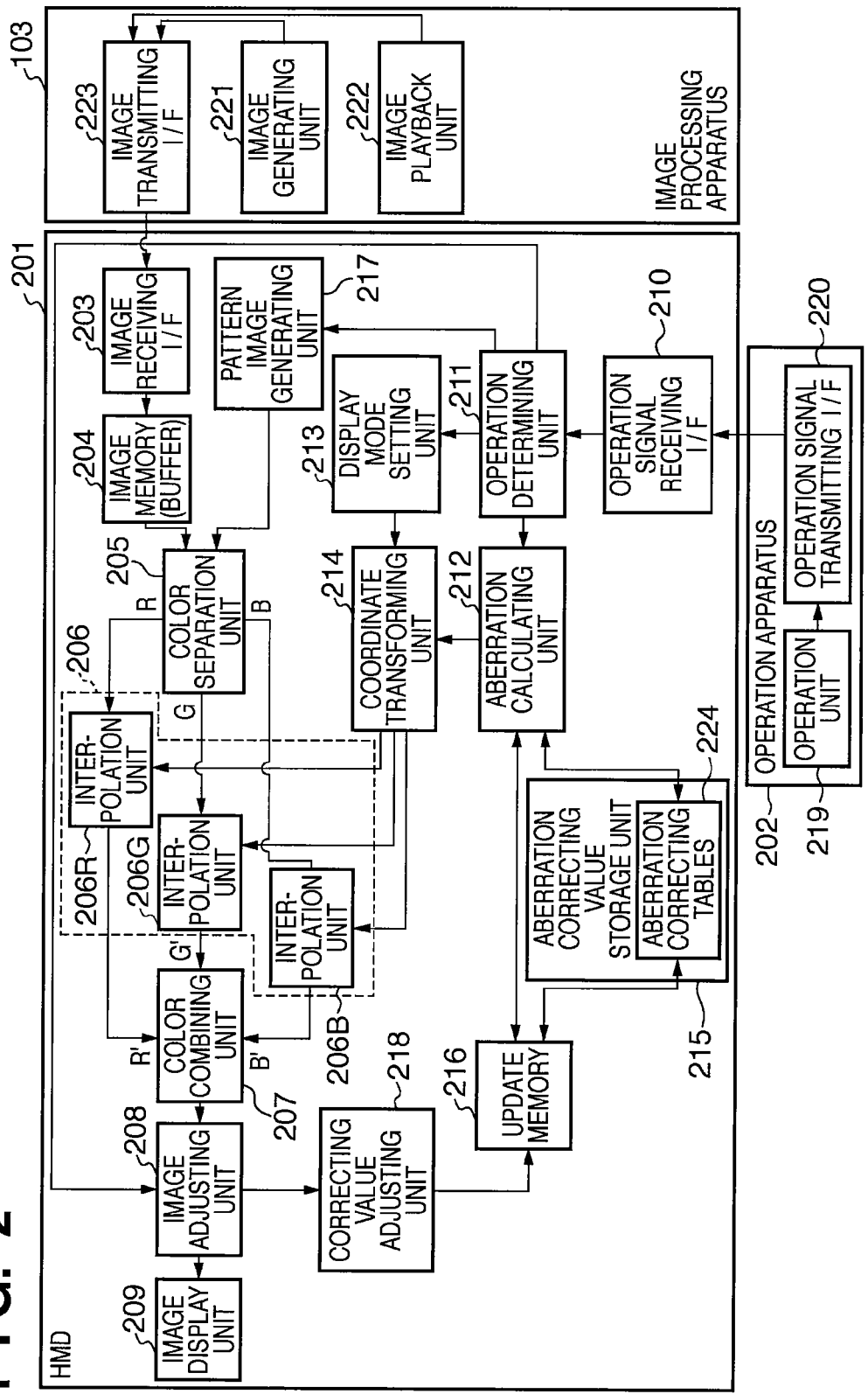
FIG. 2 is a block diagram exemplifying the functional configuration of the image processing system using the HMD in the first embodiment.

FIG. 2 is a functional block diagram of the image processing system in the first embodiment to explain features of the present invention.

An HMD 201 serves as an image display apparatus having an aberration correction function, and is configured by incorporating the controller 102 in the HMD 101 in FIG. 1. The HMD 201 includes an image receiving I/F 203 which receives an image from the image processing apparatus 103 serving as an external apparatus, an image memory 204 serving as a buffer which stores image data, a color separation unit 205 which separates image data into RGB color components, an interpolation unit 206 made up of interpolation units 206R, 206G, and 206B which calculate new colors upon coordinate transformation based on correction values, a color combining unit 207 which reconstructs one image data from separated RGB color images, an image adjusting unit 208 which performs resolution conversion and image shift (movement of an image display position) for a display image, and an image display unit 209 which displays a display image.

The HMD 201 further includes an operation signal receiving I/F 210 which receives a signal from an operation apparatus 202 serving as an external apparatus (to be described later), an operation determining unit 211 which analyzes the contents of a received operation signal and controls the respective units of the HMD based on the operation contents of the received operation signal, an aberration calculating unit 212 which calculates an aberration generated by an optical system interposed in an optical path extending from the display device to an observer and selects a correction value, a display mode setting unit 213 which sets the display mode of the HMD, a coordinate transforming unit 214 which calculates the transformed coordinates of each color based on a correction value, an aberration correction value storage unit 215 which stores correction values, an update memory 216 for creating a new correction table, a pattern image generating unit 217 which generates a predetermined pattern image for confirming color misregistration, and a correction value adjusting unit 218 which reflects the adjustment amount of the image adjusting unit 208 in a correction table.

The operation apparatus 202 accepts an operation input from an HMD user (observer) to the HMD 201. The operation apparatus 202 includes an operation unit 219 formed from buttons, a touch panel, and the like, and an operation signal transmitting I/F 220 which transmits an operation signal from the operation unit 219 to the HMD 201. The functions of the operation apparatus 202 may be collected and integrated into the HMD 201 or image processing apparatus 103.

The image processing apparatus 103 outputs an image to the HMD 201 to display it on the HMD 201. The image processing apparatus 103 includes an image generating unit 221 which generates an image, an image playback unit 222 which plays back video contents stored in an external medium or internal storage device (neither is shown), and an image transmitting I/F 223 which outputs an image to the HMD 201 serving as an external apparatus. The image processing apparatus 103 is generally an apparatus having an advanced arithmetic processing function and graphic display function, such as a personal computer or workstation.

The functional blocks of the HMD 201 will be explained below.

The image receiving I/F 203 is an interface for receiving an image output from the image processing apparatus 103. The image receiving I/F 203 functions as an interface which communicates data between the HMD 201 and the image processing apparatus 103 together with the image transmitting I/F 223 of the image processing apparatus 103. The image receiving I/F 203 preferably employs a communication standard which has a large data transmission capacity to enable real-time image display. The data communication method may be a wired method (e.g., USB, IEEE1394, HDMI®, or optical transmission) or a wireless method (e.g., UWB (Ultra Wide Band), wireless LAN, or millimeter wave communication).

The image memory 204 functions as a buffer for temporarily storing image data which is received from the image processing apparatus 103 serving as an external apparatus and formed from pixels having RGB color components.

The color separation unit 205 reads out a pixel value at arbitrary coordinates (address) from the image memory 204, and separates it into RGB color components. When luminance and color difference signals are input, the color separation unit 205 executes pre-processing to reconfigure a pixel into respective color components.

The interpolation units 206R, 206G, and 206B calculate new color values at an interpolation position based on transformed coordinates and the original values of the respective colors of a pixel. The interpolation unit 206R calculates a new value of red (to be referred to as R), the interpolation unit 206G calculates that of green (to be referred to as G), and the interpolation unit 206B calculates that of blue (to be referred to as B). Pixel values calculated by the interpolation unit 206 are those to be actually displayed on the display device.

The color combining unit 207 combines pieces of color information at a display pixel based on new color values at an interpolation position that are calculated by the interpolation units 206R, 206G, and 206B. For example, when 8 bits of data are input for each color, the color combining unit 207 combines transformed pixel values to output a total of 24 bits of pixel data from the input data of 8 bits for each color.

The image adjusting unit 208 performs a variety of image processes for final display image adjustment, including resolution conversion and image shift (movement of an image display position) for a display image, emphasis processing by filtering, and tone correction.

The image display unit 209 presents a display image to the HMD user. The image display unit 209 includes two sets of display devices and display optical systems for the right and left eyes. For example, the display device can be a compact liquid crystal display, an organic EL panel, or retinal scanning device (RID: Retinal Imaging Display) using MEMS (Micro Electro Mechanical System). The arrangement of the display optical system will be described later.

The operation signal receiving I/F 210 is an interface for receiving an operation signal from the external operation apparatus 202. The operation signal receiving I/F 210 functions as an interface which communicates data between the HMD 201 and the operation apparatus 202 together with the operation signal transmitting I/F 220 of the operation apparatus 202. The data communication method may be a wired or wireless method.

The operation determining unit 211 analyzes an operation signal received from the operation apparatus 202 and determines the operation contents of the operation signal. Based on the determined operation contents, the image adjusting unit 208, aberration calculating unit 212, display mode setting unit 213, and pattern image generating unit 217 execute corresponding functions.

The aberration calculating unit 212 calculates the amount of color misregistration based on the operation amount of the operation unit 219, and selects or calculates the correction value of each color based on the calculation result. Calculation of the amount of color misregistration will be explained later. For example, the aberration calculating unit 212 determines the reference point of a pixel to be displayed, and reads out (or calculates), from aberration correction tables 224, serving as reference tables, coordinates to which the reference point is to be transformed.

The display mode setting unit 213 sets an HMD display mode complying with an application of the image processing system using the HMD or the intention of the HMD user. Note that the application of the system using the HMD means an application purpose of the HMD, and includes, for example, only appreciation of movies and the use of the MR system accompanied by actual work.

The HMD display mode represents a difference in image representation depending on a setting of a reference color (R or B) in chromatic aberration correction out of the three, R, G, and B primary colors which form an image. The enlargement ratio of a corrected image differs between an R reference color with a small aberration and a B reference color with a large aberration. Hence, the image representation can be changed by changing the reference color. For example, when R is set as the reference color, an entire image can be displayed so that an entire corrected image fits on the whole screen of the display device. When displaying an entire corrected image, an entire inversely corrected image is displayed on the display device to form a display image. This produces an area where no image is displayed on the display device. To the contrary, when B is set as the reference color, a display giving priority to the size of an observation target becomes possible. In this case, a corrected image with a high enlargement ratio is used and the display area of the display device is effectively used so as to avoid generating an area where no image is displayed on the display device. However, avoiding an area where no image is displayed on the display device takes priority over fitting an entire inversely corrected image on the display device. Thus, part of an image may extend beyond the display area of the display device, and be sacrificed. General distortion correction often uses G as the reference color of aberration correction. However, the present embodiment pays attention to the difference in image representation and uses R or B as the reference color. Note that the reference color of aberration correction is not limited to R or B. Details of the reference color setting will be described later.

The coordinate transforming unit 214 calculates the transformed coordinates of each color based on a correction value selected by the aberration calculating unit 212 and an HMD display mode set by the display mode setting unit 213. To reduce the memory capacity required, the aberration correction table is assumed to store the transformed coordinates of a specific color and differences from the specific color for the remaining colors (except the specific color). The coordinate transforming unit 214 obtains the transformed coordinates of the remaining colors from the coordinates of the specific color (reference color) and the difference values.

The aberration correction value storage unit 215 stores aberration correction values. In the embodiment, the aberration correction value storage unit 215 stores a plurality of aberration correction tables (aberration correction tables 224) which are prepared in advance and hold different correction amounts. More specifically, the aberration correction tables 224 hold a plurality of types of correction data prepared in advance to correct aberrations generated by the optical system of the HMD 201. In place of the aberration correction table, it is possible that a polynomial parameter table is stored and the aberration calculating unit 212 executes correction according to an approximate polynomial.

In the embodiment, the HMD 201 includes the aberration correction value storage unit 215. However, the image processing apparatus 103 may incorporate the aberration correction value storage unit 215 as long as an aberration correction table can be read from an external apparatus. When the HMD 201 has a reading/writing means for external memories and media (e.g., CD, DVD, and SD® and CF® memory cards), an external memory or medium may function as the aberration correction value storage unit 215.

The update memory 216 stores a new correction value which is calculated by the aberration calculating unit 212 based on a correction value prepared in advance. In the embodiment, the aberration calculating unit 212 calculates new correction values in accordance with two or more correction tables selected by a predetermined selection criterion, which will be described later. The update memory 216 stores the calculated values.

The pattern image generating unit 217 generates a predetermined pattern image to be displayed on the image display unit 209. The predetermined pattern image generated by the pattern image generating unit 217 is a sharp pattern image which allows the HMD user to observe and confirm color misregistration. The "sharp" image means a high-contrast image like a white line with a width of at most several pixels on a black background in which a white pixel is surrounded by black pixels.

The correction value adjusting unit 218 reflects the adjustment contents of the image adjusting unit 208 in an adjusted correction value. The correction value adjusting unit 218 adjusts a current correction value based on the result (adjustment value) of adjustment processing such as resolution conversion and image shift (movement of an image display position) executed by the image adjusting unit 208.

The functional blocks of the HMD 201 have been described. In a further embodiment the HMD may comprise the image display unit 209 whilst the image processing apparatus 103 comprises all of the remaining functional units of the HMD 201, as illustrated in FIG. 2. The image processing apparatus 103 thus has the aberration correction function. In such a case the HMD will comprise an image receiving interface for receiving corrected images from the image processing apparatus 103. Correspondingly the image processing apparatus 103 will have an image transmitting interface for transmitting the corrected images output by image adjusting unit 208 to the HMD. Next, the operation apparatus 202 will be explained.

The operation unit 219 accepts various inputs to operate the HMD 201 by the HMD user. The operation unit 219 includes a, preferably compact, operation device capable of a pointer operation on the screen, such as four- or two-way operation button, touch panel, track ball, or track pad. The operation unit 219 may have a voice input function to allow an operation by voice command. The operation unit 219 may also have a function of detecting the motion of the hand of the HMD user to accept an operation instruction by the motion of the user.

The operation signal transmitting I/F 220 transmits an operation signal from the operation unit 219 to the HMD 201. The data communication method may be a wired or wireless method.

The functional blocks of the operation apparatus 202 have been described. The image processing apparatus 103 will now be explained.

The image generating unit 221 generates an image to be displayed on the HMD 201. In the MR system, the image generating unit 221 generates in real time a CG image to be observed by the HMD user. When a video see-through HMD is used, the image generating unit 221 executes image composition to superimpose a generated virtual space image (CG) on a physical space image captured by the HMD.

The image playback unit 222 reads and plays back video contents recorded on an external memory, external medium (e.g., DVD), or internal storage device (e.g., HDD) (none are shown).

The image transmitting I/F 223 is an interface for transmitting an image generated by the image generating unit 221 or image playback unit 222 to the HMD 201. As described above, the data communication method may be a wired or wireless method.

The image processing system having the above-described configuration can perform aberration correction in accordance with the user of the HMD 201 and obtain a display image having undergone aberration correction appropriate for each user. Aberration correction in the first embodiment will now be described in detail.

Figure 3:
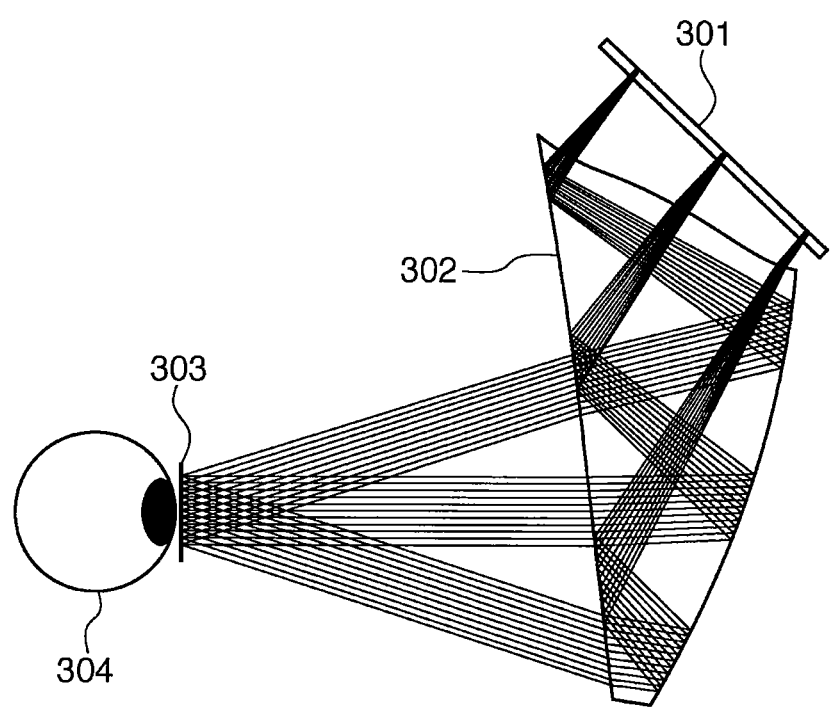
FIG. 3 is a view exemplifying the display optical system of the HMD in the first embodiment.

FIG. 3 is a view exemplifying the display optical system of the image display unit 209 of the HMD.

A display device 301 is, e.g., a liquid crystal or organic EL device. When the display device 301 is a liquid crystal device, it is illuminated with light emitted by a backlight (not shown) serving as a light source via the filters of respective colors. When the display device 301 is an organic EL device, it does not require a backlight because of self luminescence. The panel forms a color image to be presented to the operator. The display device may be an image forming apparatus using a MEMS device for forming an image.

A prism 302 having a curved surface enlarges rays from the display device 301 and guides them to the pupil. The "free curvature" prism 302 can implement a flat, compact structure compared to a simple lens.

An image forming point 303 is formed by the display device. By adjusting a pupil 304 to this position, the observer can see a large display image obtained by enlarging an image on the display device 301. In this manner, the free curvature prism 302 functions as an enlargement optical system for enlarging a display image formed on the display device 301 and allowing an observer to observe it.

The influences of various aberrations generated by an optical system are generally suppressed by a plurality of lens groups. To implement a compact HMD, it is important to simplify the optical system and reduce its size and weight. For this purpose, it is effective to design a cooperative system which digitally corrects some aberrations such as distortion and chromatic aberration.

FIG. 4 is a block diagram showing the hardware configuration of a computer such as the image processing apparatus 103.

A CPU 401 controls the overall computer using programs and data stored in a RAM 402 and ROM 403. In addition, the CPU 401 executes processing to be performed by the image processing apparatus 103 to which the computer is applied.

The RAM 402 has an area for temporarily storing programs and data loaded from an external storage device 406, an image generated by the image generating unit 221, image data to be played back by the image playback unit 222, and the like. The RAM 402 also has a work area used when the CPU 401 executes various processes. If necessary, the RAM 402 can provide a variety of areas to various processes.

The ROM 403 stores setting data, a boot program, and the like for the computer.

An operation unit 404 includes a keyboard and mouse. The operator of the computer can operate the operation unit 404 to input various instructions to the CPU 401.

A display unit 405 is formed from a CRT, liquid crystal screen, or the like. The display unit 405 can display, to the operator, the processing results of the CPU 401 and a graphics board (not shown) as images and a text.

The external storage device 406 is a large-capacity information storage device represented by a hard disk drive. The external storage device 406 stores an OS (Operating System), and programs and data to cause the CPU 401 to execute processes to be performed by the image processing apparatus 103. If necessary, these programs and data are loaded to the RAM 402 under the control of the CPU 401, and processed by the CPU 401.

An I/F 407 corresponds to the image transmitting I/F 223 shown in FIG. 2. The I/F 407 mainly functions as an interface to transmit a display image to the HMD 201 in order to communicate data to the HMD 201.

A bus 408 interconnects the above-described units.

Figure 5:
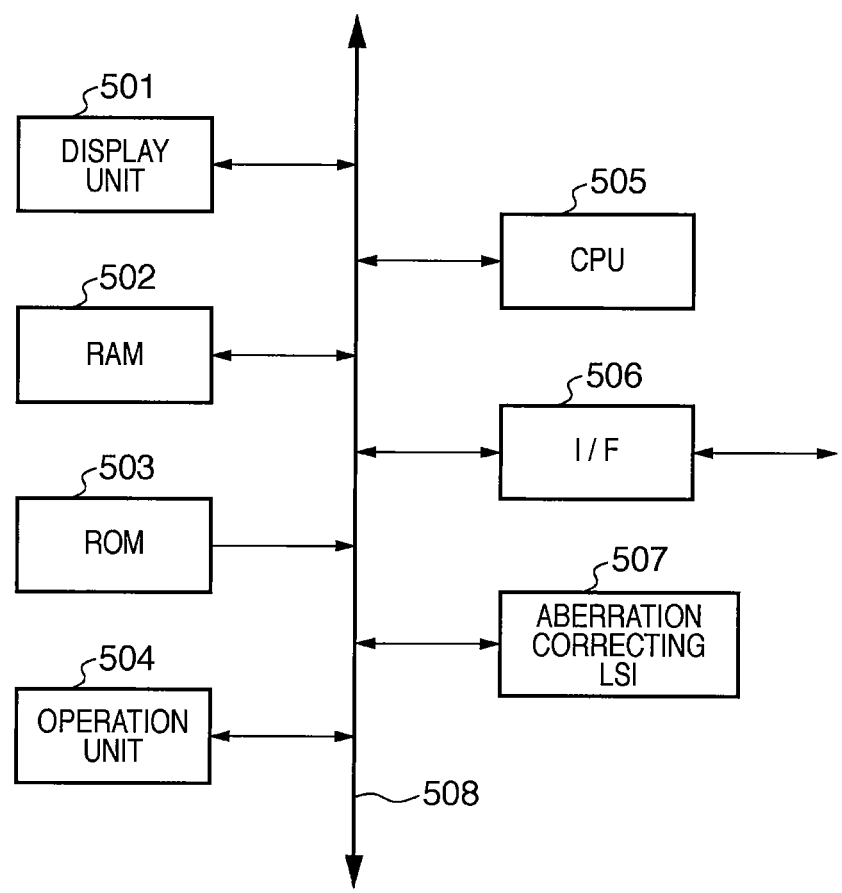
FIG. 5 is a block diagram exemplifying the hardware configuration of the HMD in the first embodiment.

FIG. 5 is a block diagram showing the hardware configuration of the HMD 201.

A display unit 501 corresponds to the image display unit 209.

A RAM 502 has a work area used when a CPU 505 executes various processes, and an area for temporarily storing data received from the external image processing apparatus 103 via the image receiving I/F 203.

A ROM 503 stores programs to cause the CPU 505 to execute processes (to be described later) to be performed by the HMD 201, data about the display settings of the HMD 201 and aberration correction values, and personal authentication data corresponding to correction values.

An operation unit 504 corresponds to the operation apparatus 202 of the HMD 201.

The CPU 505 executes a program to control a variety of devices, including initial settings of the HMD 201.

An I/F 506 corresponds to the image receiving I/F 203 shown in FIG. 2.

An aberration correction LSI circuit 507 executes an aberration correction function in the first embodiment. The aberration correction LSI circuit 507 is assumed to be an ASIC (Application Specific Integrated Circuit). Alternatively, a DSP (Digital Signal Processor) may describe and implement the function by software. Details of the processing contents will be described later.

A bus 508 interconnects the above-mentioned units.

When the HMD is a video see-through HMD in the MR system, a three-dimensional position and orientation sensor (not shown) may be connected to the bus 508 to obtain position and orientation information of the HMD user. The three-dimensional position and orientation sensor uses a magnetic sensor or gyroscope (acceleration and angular rate). Some arrangements obtain position and orientation information from only an image captured by an internal camera, so the three-dimensional position and orientation sensor is not essential.

Figure 6A:
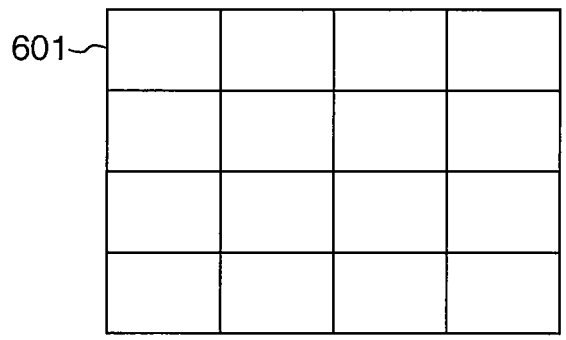
FIGS. 6A to 6C are schematic views for explaining distortion and chromatic aberration of magnification in the first embodiment.
Figure 6B:
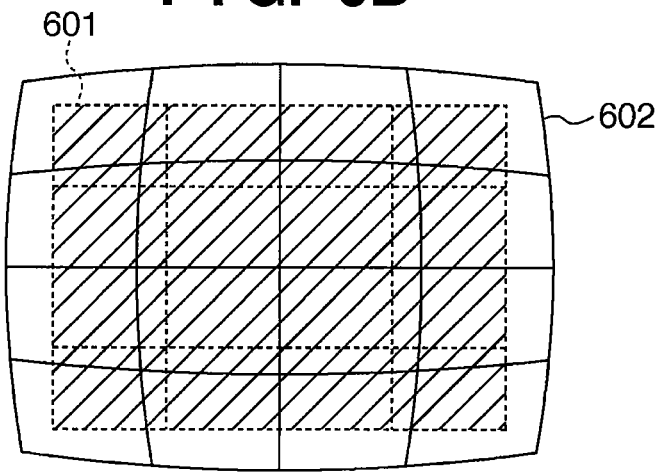
Figure 6C:
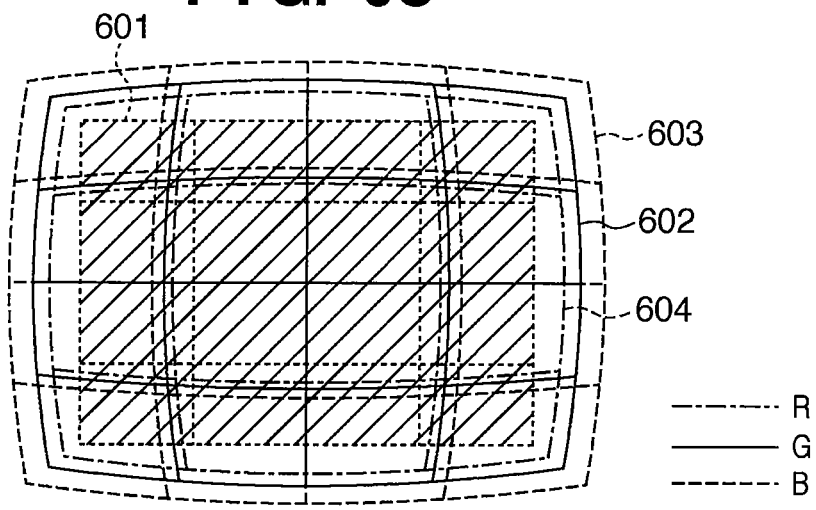

FIGS. 6A to 6C are views for explaining distortion and chromatic aberration of magnification. An inversely corrected image distorted in a direction opposite to an aberration generated on a lens is displayed to cancel the aberration of the lens and display a normal image.

FIG. 6A is a view showing an undistorted FIG. 601 (i.e., an original image of display). FIG. 6B is a view showing a G image 602 distorted in a barrel-like manner owing to distortion of the display optical system. FIG. 6C is a view showing chromatic aberration of magnification in addition to distortion.

In FIG. 6C, a solid line indicates G (the G image 602), a broken line indicates B (a B image 603), and a chain line indicates R (an R image 604) out of the three, R, G, and B primary colors. FIG. 6C shows that the display magnification differs between the color components of a display image.

The three, R, G, and B primary colors which form an image have different wavelengths of light. The refractive index differs between these colors via the display optical system. As a result, the image forming positions of these colors deviate from each other, and color misregistration (display magnification difference) occurs on the display image. In general, a ray with a short wavelength is refracted at a smaller angle than a ray with a longer wavelength. Thus, a B ray is refracted more than an R ray. In contrast, an R ray is refracted less than a B ray.

Attention is paid to one point on an original image. An optical system which enlarges and displays an image formed on the display device forms R, G, and B points so that they deviate outward in the order of R, G, and B (R being closer to the optical origin) with respect to a white point which forms an original image, thus generally exhibiting the phenomenon of dispersion.

As a result, the R image 604 is formed inside the G image 602, and the B image 603 is formed outside it. This phenomenon causes color misregistration (color bleedings) at the edge of the image of even a monochrome object. This phenomenon also generates similar color misregistration at the edge of even a color image object, such as a boundary region where the color changes. The color misregistration increases from the center to periphery (outside) of a display image.

In image formation via a real lens, when the FIG. 601 in FIG. 6A is formed, the image is distorted as shown in FIG. 6C, and the image forming position (magnification) changes depending on the color. The former phenomenon for a single color is called distortion, and the difference in magnification depending on the color difference is called chromatic aberration of magnification. When a display image distorts like a barrel owing to aberrations of the display optical system, like the example of FIG. 6C, digital processing is applied to form an image on the display device which is inversely distorted, thereby canceling the aberrations of the display optical system.

The first embodiment further performs aberration correction corresponding to (the optical system of) an observer in the digital aberration correction method for the above-mentioned aberrations. The overall sequence of this processing will be described below.

Figure 7:
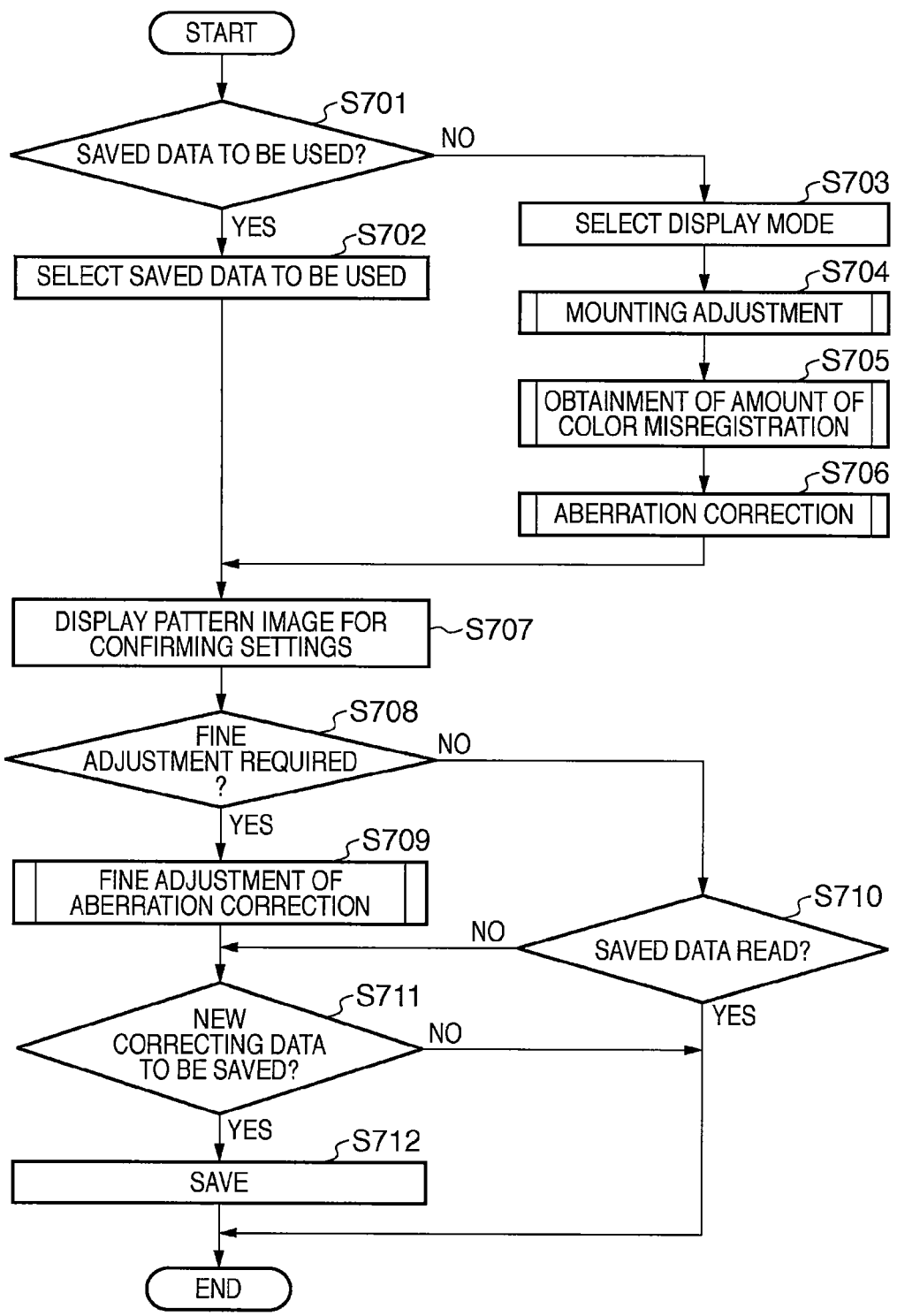
FIG. 7 is a main flowchart showing the processing sequence of the HMD in the first embodiment.

FIG. 7 is a main flowchart showing the overall sequence in the first embodiment. This sequence is executed at the start of using the HMD 201. However, the processing of this flowchart is not limited to the start of using the HMD 201, and can be arbitrarily invoked even during the use of it, as needed.

In step S701, the HMD 201 checks whether it has been used before and whether there are aberration correction data stored in the aberration correction value storage unit 215 at that time. If there are aberration correction data stored in the past, the HMD 201 prompts the HMD user to determine whether to use them. As the method of prompting the HMD user to make a determination, for example, the image display unit 209 of the HMD 201 displays a specific image (e.g., a message "do you want to use previous settings?"), or a voice query (e.g., a message "do you want to use previous settings?") is used for a determination.

If aberration correction data have been stored in the past and the HMD user instructs the HMD 201 to use them, the process shifts from step S701 to step S702. If there is no data stored in the past or the HMD user instructs the HMD 201 to newly create aberration correction data, the process shifts from step S701 to step S703.

In step S702, the HMD 201 prompts the HMD user to select data to be used from the stored aberration correction data. As the method of prompting the HMD user to make a selection, for example, a list of stored data is displayed as a list having a hierarchical structure classified by group or the like, or a voice message, such as "what is your name?" is output.

In the particular embodiment the HMD user inputs a selection by operating a pointer on the display image on the image display unit 209 via the operation unit 219. Other selection input methods are a pointer operation by inputting the line of sight when the HMD 201 has a line-of-sight detection function, a pointer operation based on the motion of the hand of the user of the HMD 201, and a voice reply. In addition, the HMD 201 can be configured to have a personal authentication function, e.g., a face recognition, retinal scanning, or vein authentication function, via which it automatically authenticates an HMD user, and selects correction data for use.

In step S703, the HMD 201 prompts the HMD user to select an HMD display mode. The difference in the HMD display mode is the difference in the reference color used in aberration correction, as described above. The difference in a display image depending on the HMD display mode will be explained with reference to FIGS. 8A to 8C.

In step S704, the HMD 201 adjusts the mounting of the HMD. In the mounting adjustment, an image display position on the display device is adjusted. An optical axis connecting the optical origin of the optical system to the pupil position of the observer is made to match the image display position before obtaining aberration information (amount of color misregistration) in step S705. Details of this processing will be described later with reference to FIG. 9.

In step S705, the HMD 201 obtains the amount of color misregistration confirmed by the pupil of the HMD user, details of which will be described later with reference to FIG. 11.

In step S706, the HMD 201 performs aberration correction based on the amount of color misregistration obtained in step S705, determining final aberration correction data, details of which will be described later with reference to FIG. 14.

By this processing, aberration correction data used for the HMD user is determined.

In step S707, the HMD 201 displays a specific pattern image on the image display unit 209 and prompts the HMD user to confirm whether the aberration correction is correct.

In step S708, the HMD 201 prompts the HMD user to determine whether the color misregistration has been appropriately corrected, because the color misregistration falls within an allowable range, or whether fine adjustment is required. By the above-mentioned pointer operation, voice input, or the like, the HMD user designates whether or not fine adjustment is required.

If the HMD user inputs the necessity of fine adjustment, the process shifts to step S709. If no fine adjustment is required, the process shifts to step S710.

In step S709, the HMD 201 performs fine adjustment of aberration correction, details of which will be described later with reference to FIG. 16.

By this processing, aberration correction data having undergone correction appropriate for the HMD user is generated.

In step S710, the HMD 201 determines whether the aberration correction data generated in the preceding steps is identical to read data stored in the past. If aberration correction data stored in the past is read and used and no fine adjustment is required, the generated aberration correction data need not be stored again in the aberration correction value storage unit 215. Thus, the HMD 201 ends the aberration correction processing for the user and shifts to a normal operation.

The normal operation means an operation to receive an image (generated by the image generating unit 221 or played back by the image playback unit 222) by the HMD 201 from the image processing apparatus 103, display it, and present the contents to the HMD user.

In step S711, the HMD 201 prompts the HMD user to determine whether to store the aberration correction data determined or newly generated by the preceding processing. If the HMD user instructs the HMD 201 to store the aberration correction data, the process shifts to step S712. If the HMD user instructs the HMD 201 not to store the aberration correction data, the HMD 201 ends the processing of this sequence and shifts to the normal operation.

In step S712, the HMD 201 stores the aberration correction data in the aberration correction value storage unit 215. At this time, the aberration correction data is stored in the aberration correction value storage unit 215 in correspondence with information capable of specifying an individual, so that the aberration correction data can be read next time the HMD is used. The information capable of specifying an individual includes, for example, the individual name, number, and data for retina authentication, vein authentication, or voiceprint authentication.

After the end of step S712, the HMD 201 ends the processing of this sequence and shifts to the normal operation.

In the first embodiment, it is determined that the user does not change during the normal operation of the HMD 201, and one correction value (correction table) determined according to the flowchart of FIG. 7 is used in principle. More specifically, it is controlled to use a piece of information of correction data determined in the foregoing way while the user continues observation. If necessary, the sequence can be invoked to change the correction table for use even while the HMD 201 is in use.

Figure 8A:
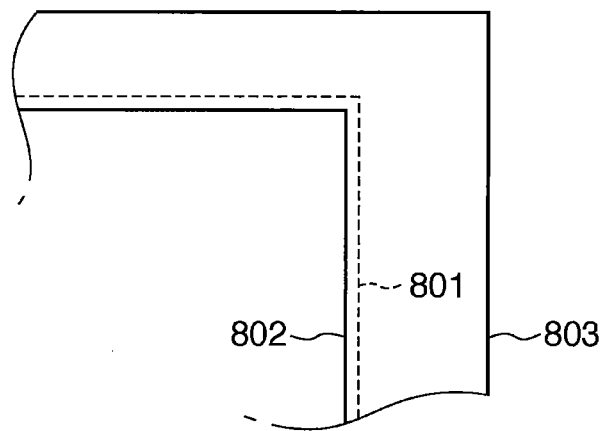
FIGS. 8A to 8C are schematic views for explaining an HMD display mode in the first embodiment.
Figure 8B:
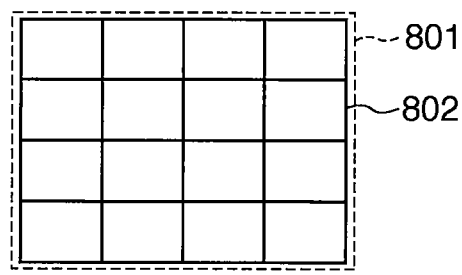
Figure 8C:
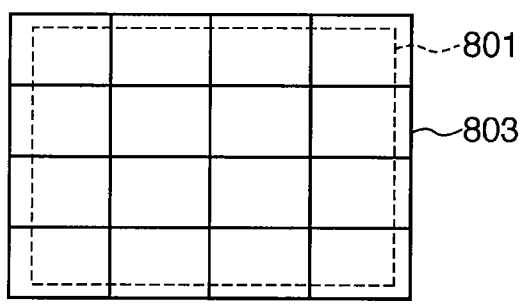

FIGS. 8A to 8C are views for explaining the HMD display mode.

In the first embodiment, the HMD display mode of the HMD 201 can be selected to comply with the application of the image processing system using the HMD 201 or the intention of the HMD user. The HMD display mode in the embodiment means the difference in image representation (image enlargement ratio) depending on the difference in the reference color of aberration correction. In the example of the present embodiment, two image representations are assumed to be set based on a display mode giving priority to display of a whole image when R (Red) is used as the reference, and a display mode giving priority to the actual size of an observation target when B (Blue) is used as the reference. On this premise, the optical design makes a displayed image (captured image) almost match a physical object in size upon B-based aberration correction.

FIG. 8A is a schematic view showing a difference depending on the difference in the reference color of aberration correction. FIG. 8B is a schematic view showing a display image on the HMD when R is the reference color of aberration correction. FIG. 8C is a schematic view showing a display image on the HMD when B is the reference color of aberration correction.

As described above with reference to FIGS. 6A to 6C, an optical system which enlarges and displays an image formed on the display device forms R, G, and B points so that they deviate outward in the order of R, G, and B (with R being closer to the optical origin) with respect to a white point which forms an original image. On an original image formed from the three, R, G, and B primary colors, the enlargement ratio of the B image becomes highest. If a B image forming position having the highest enlargement ratio is used as the reference to correct an aberration, a corrected image at a high enlargement ratio is displayed. In contrast, if an R image forming position having a low enlargement ratio is used as the reference to correct an aberration, a corrected image at a low enlargement ratio is displayed.

FIG. 8A shows a display image 802 when R is set as the reference color of aberration correction and a display image 803 when B is set as the reference color in a maximum display area 801 of the display device. FIG. 8A shows the difference between corrected display images depending on the difference in the reference color.

FIG. 8B is a view showing a display image in the display mode giving priority to display of a whole image. In this display mode, an entire corrected image is displayed preferentially to the actual size of an observation target when an aberration is corrected using R as the reference color of aberration correction. A display image is formed by fitting an entire inversely corrected image on the display device. This generates an area, between 801 and 802, where no image is displayed on the display device.

FIG. 8C is a view showing a display image in the display mode giving priority to the actual size of an observation target. In this display mode, an observation target is reproduced in actual size, instead of displaying an entire corrected image when an aberration is corrected using B as the reference color of aberration correction. To effectively use the overall display area of the display device, part of an inversely corrected image extends beyond the display area of the display device, losing part (the periphery) of the image. Hence, a displayed image can use all the pixels of the display device which is not rectangular.

The actual size-priority display mode shown in FIG. 8C is effective especially for an MR system using a video see-through HMD. The MR system is sometimes accompanied by work by the HMD user in the MR space depending on the application. In the entire display-priority display mode, the motion of the hand of the HMD user that is observed via the video see-through HMD does not match the sensation of movement of the HMD user, and as result he may feel odd. Generally when a person works within reach, he gazes at an object and hardly pays attention to the periphery of his vision, so it is less necessary to see the whole scene surrounding the object. By using this human perception, a display which reproduces an actual size can cancel a mismatch between the sensation of movement and the vision.

As described above, the HMD according to the embodiment can present an image display corresponding to the situation by selecting a display mode based on the application of the MR system or the intention of the HMD user.

Note that the optical design reproduces an actual size when B is used as the reference in the present embodiment, but may be configured to reproduce an actual size when R or G is used as the reference. When B is set as the reference, the display device can be used effectively to display an image enlarged entirely. Before selecting the display mode, it is important to set whether to effectively use the pixels of the panel.

Figure 9:
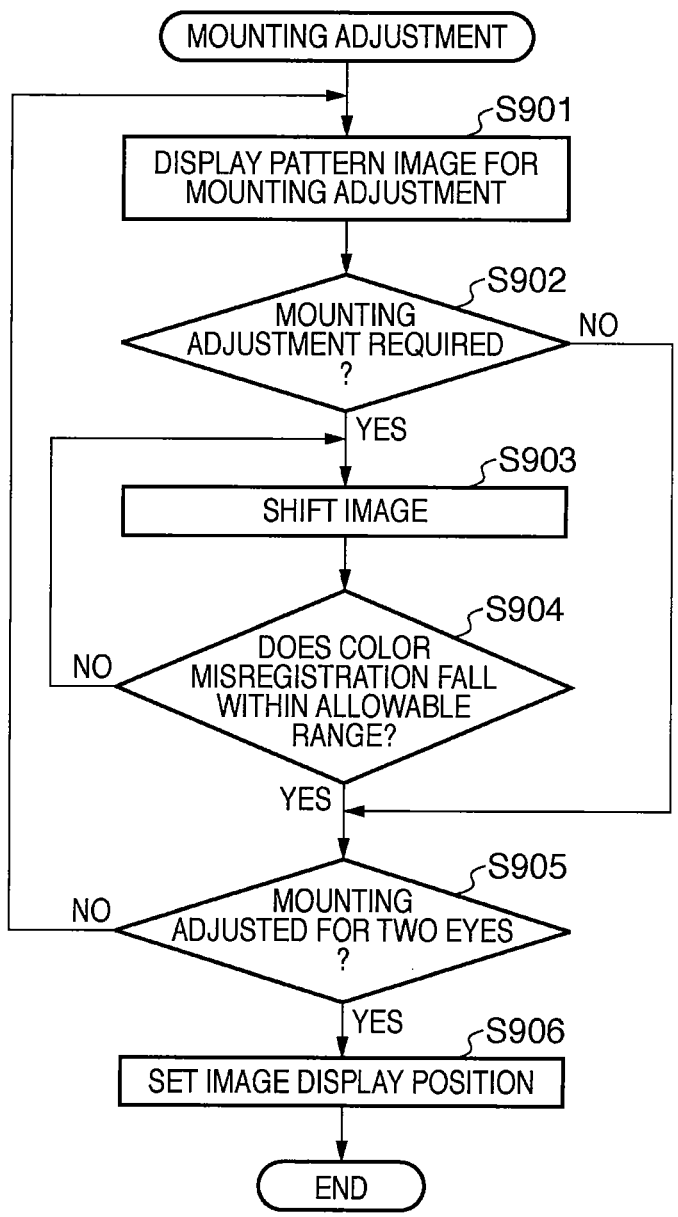
FIG. 9 is a flowchart showing mounting adjustment processing in the first embodiment.

FIG. 9 is a flowchart showing a detailed sequence of mounting adjustment in step S704 of FIG. 7. The image display position is digitally adjusted to make it almost match an optical axis connecting the optical origin and pupil position.

The mounting adjustment in the first embodiment is processing to digitally adjust the image display position with respect to the display area of the display device on the premise that the HMD 201 is mounted correctly. "Mounted correctly" means mounting the HMD 201 in a way as described in the instruction manual or the like. "Mounted correctly" also means properly adjusting the pupil distance when the HMD 201 includes a pupil distance adjusting mechanism.

In some cases, the optical origin and pupil position may not match the optical axis when the HMD 201 is mounted correctly. In this case, color misregistration may occur even near the center of the display screen. To suppress the generation of color misregistration at the center of the display, the center of a display image needs to be set on an axis connecting the optical origin and pupil position.

In step S901, the pattern image generating unit 217 generates a pattern image for mounting adjustment, and the image display unit 209 displays it for one eye. At this time, no image is displayed for the other eye, and the mounting adjustment is executed for each eye. The displayed pattern image will be explained with reference to FIGS. 10A to 10D.

In step S902, the HMD 201 prompts the HMD user to observe the displayed pattern image and determine whether the display image suffers color misregistration, i.e., needs to be adjusted. By using the above-mentioned pointer operation or voice, the HMD user inputs an instruction of whether the adjustment is necessary. If the user inputs an instruction that the adjustment is required, the process shifts to step S903; if he inputs an instruction that no adjustment is required, to step S905.

In step S903, the image adjusting unit 208 moves the image display position on the display surface based on an instruction input to the operation unit 219 by the HMD user (to be referred to as image shift processing).

In step S904, the HMD 201 prompts the HMD user to determine whether the color misregistration observed by his pupil falls within a range allowable by him. If the color misregistration falls within the allowable range, the image shift processing ends, and the process shifts to step S905. If the color misregistration does not fall within the allowable range, the image shift processing (step S903) is repeated to make the color misregistration fall within the allowable range.

In step S905, the HMD 201 determines whether the mounting adjustment has been executed for the two eyes. If the processing has ended for the two eyes, the mounting adjustment processing ends. If the adjustment has been executed for only one eye, the process returns to step S901 to execute the mounting adjustment for the other eye. In step S906, the image display position adjusted by the preceding processing is set in the image adjusting unit 208. The correction value adjusting unit 218 stores the shift amount of the image display position. The shift amount of the image display position adjusted in the mounting adjustment needs to be reflected in a correction center position in the aberration correction tables 224, and serves as the precondition of aberration correction (to be described later).

By the above-described processing, a display image is digitally moved in the display area of the display device. This can suppress generation of color misregistration at the center of the display image.

It is designed not to generate aberrations near the optical origin of the optical system, and it is assumed that color misregistration hardly occurs. Hence, the adjustment amount in this adjustment falls within a range of several pixels at most, except in a case in which no pupil distance adjusting mechanism is provided.

FIGS. 10A to 10D are schematic views for explaining a displayed pattern image and a determination made by the HMD user in the mounting adjustment.

Figure 10A:
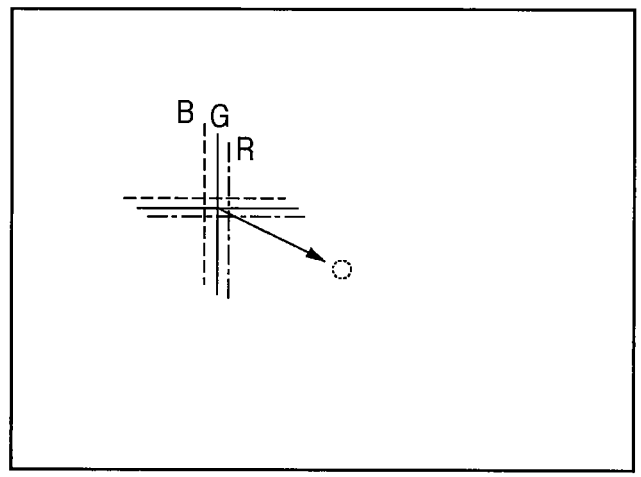
FIGS. 10A to 10D are schematic views for explaining a pattern image displayed in mounting adjustment in the first embodiment.

In FIG. 10A, a pattern image is displayed at the optical origin position, but the image display position does not match the optical axis connecting the optical origin of the optical system and the pupil of an observer. Thus, the HMD user confirms color misregistration and separately observes R, G, and B which form white. In the first embodiment, a pattern displayed in mounting adjustment is a cross-shaped white thin line having a width of several pixels at most (background color is black). Since it suffices to confirm generation of color misregistration, the pattern image is not limited to the cross shape and may be quadrangular or triangular. Note that the pattern image is preferably white containing all the three, R, G, and B primary colors.

Figure 10B:
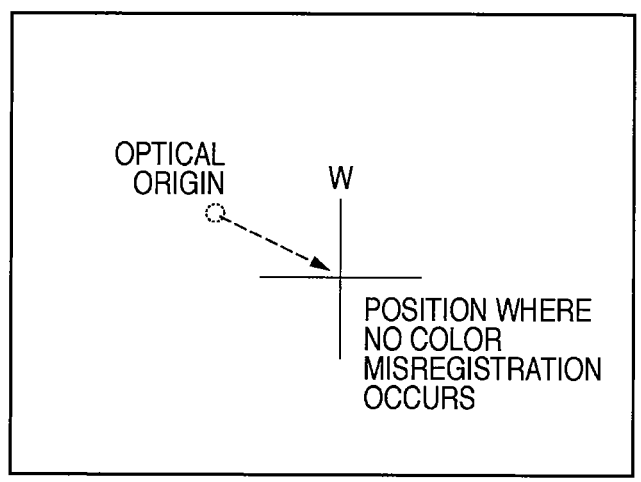

In FIG. 10B, the image display position matches the optical axis connecting the optical origin of the optical system and the pupil of the observer, so the center of the display image is located at a position free from color misregistration. The HMD 201 prompts the HMD user to operate the operation unit 219 so that he can observe a clear pattern image as shown in FIG. 10B. The image adjusting unit 208 moves the image display position based on an operation to the operation unit 219 by the HMD user. As a result, the image observed by the pupil of the HMD user is adjusted from one in FIG. 10A to one in FIG. 10B. The center position of the image is therefore adjusted from the optical origin position to a color misregistration-free position, as indicated by arrows in FIGS. 10A and 10B.

At this time, the pupil of the HMD user observes a white line formed by superimposing R, G, and B which have been observed separately. From this, the HMD user determines whether the generated color misregistration is canceled or falls within an allowable range. Color misregistration falling within an allowable range means that the HMD 201 is mounted correctly by adjusting the center of a display image onto the optical axis connecting the pupil and optical origin so that the image is observed correctly.

Figure 10C:
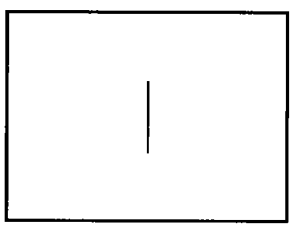
Figure 10D:
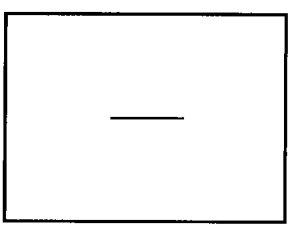

Note that a cross-shaped pattern image is displayed in FIGS. 10A and 10B, but the pattern image is not limited to this. For example, when the operation unit 219 of the operation apparatus 202 allows an operation to move an image in only a one-dimensional direction, pattern images of single white thin lines may be displayed one by one as shown in FIGS. 10C and 10D to perform mounting adjustment. In this case, adjustment is executed sequentially by adjusting horizontal color misregistration using a vertical line in FIG. 10C, and then vertical color misregistration using a horizontal line in FIG. 10D.

Figure 11:
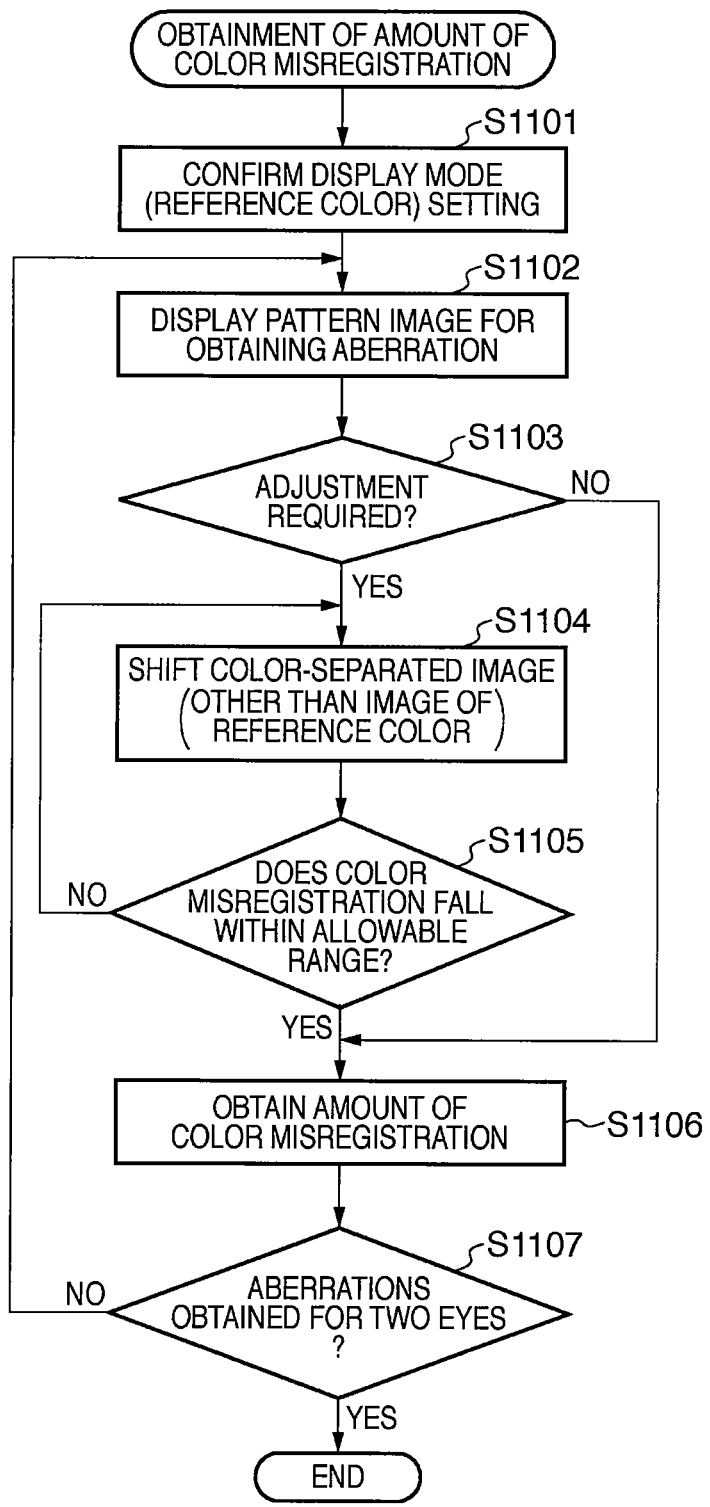
FIG. 11 is a flowchart showing color misregistration amount obtainment processing in the first embodiment.

FIG. 11 is a flowchart showing a detailed sequence of color misregistration amount obtainment processing in step S705 of FIG. 7 in the first embodiment.

In the first embodiment, the amount of color misregistration is obtained to obtain the amount of color misregistration observed by the pupil of the HMD user. That is, the amount of color misregistration generated by a combination of the display optical system of the HMD and a vision correction optical system used by the HMD user is obtained. The HMD 201 is assumed to have in advance an aberration correction table for correction color misregistration generated by the display optical system of the HMD 201.

In step S1101, the HMD 201 obtains an HMD display mode set in step S703 from the display mode setting unit 213, and reflects it in the coordinate transforming unit 214. The HMD display mode is the setting of the reference color in distortion correction, as described above.

In step S1102, the HMD 201 causes the pattern image generating unit 217 to generate a pattern image for obtaining the amount of color misregistration. The HMD 201 displays the pattern image at a designated position (e.g., a peripheral position in the display area) corresponding to one eye on the image display unit 209. At this time, no image is displayed for the other eye, and the amount of color misregistration is obtained for each eye. The pattern image displayed to obtain the amount of color misregistration will be explained with reference to FIGS. 12A to 12C.

In step S1103, the HMD 201 prompts the HMD user to indicate whether the display image suffers color misregistration, i.e., adjustment is required. By the above-mentioned pointer operation, voice, or the like, the HMD user designates whether fine adjustment is required. If adjustment is required, the process shifts to step S1104; if it is not required, to step S1106.

In step S1104, the image adjusting unit 208 moves the image display position of the pattern image based on an instruction input to the operation unit 219 by the HMD user (image shift processing). In the image shift processing in step S1104, the image adjusting unit 208 moves color-separated images of colors other than the reference color out of color-separated images which form the pattern image.

Steps S1104 and S1105 are repetitively executed for color-separated images of two colors other than the reference color.

For example, when R is set as the reference color (i.e., display mode) of aberration correction, the HMD 201 prompts the HMD user to operate a G pattern image (G color-separated image) exhibiting a degree of color misregistration close to that of R and then operate a B pattern image (B color-separated image). When B is set as the reference color, the HMD 201 prompts the HMD user to operate a G pattern image (G color-separated image) and then an R pattern image (R color-separated image). Consequently, color misregistration is canceled.

More specifically, when R is set as the reference color, the HMD 201 prompts the HMD user to shift an image so that the G pattern image overlaps the R pattern image. When the two pattern images overlap each other, the HMD user observes yellow (to be referred to as Y). Then, the HMD 201 prompts the HMD user to shift an image so that the B pattern image overlaps the Y pattern image. When the Y and B pattern images overlap each other, the HMD user observes white (to be referred to as W). The aberration calculating unit 212 obtains the image shift amount at this time.

In step S1105, the HMD 201 prompts the HMD user to determine whether the color misregistration observed by his pupil falls within a range allowable by him. If the HMD user inputs an instruction to the operation unit 219 that the color misregistration falls within the allowable range, the image shift processing ends, and the process shifts to step S1106. If the HMD user inputs an instruction to the operation unit 219 that the color misregistration does not fall within the allowable range, the HMD 201 repetitively executes the image shift processing in step S1104.

The displayed pattern image will be described with reference to FIGS. 12A to 12C. When there are a plurality of color misregistration amount obtaining positions, steps S1104 and S1105 are repetitively executed at the respective obtaining positions.

By this processing, the HMD user shifts the pattern image until the color misregistration is canceled, or in practice, reduced to an allowable level. The shift amount represents the amount of color misregistration observed by the HMD user.

In step S1106, the aberration calculating unit 212 obtains the amount of color misregistration from the pattern image shift amount by the HMD user in the foregoing way, and stores it in the RAM 502 of the HMD 201.

In step S1107, the HMD 201 determines whether the adjustment has been executed for the two eyes. If amounts of color misregistration have been obtained for the two eyes, the process ends. If the adjustment has been executed for only one eye, the process returns to step S1102 to obtain the amount of color misregistration for the other eye.

By this processing, amounts of color misregistration generated by a combination of the display optical system of the HMD and a vision correction optical system used by the HMD user are obtained for the two eyes.

FIGS. 12A to 12C are schematic views for explaining examples of a pattern image displayed when obtaining the amount of color misregistration as described above.

FIG. 12A exemplifies pattern images when obtaining amounts of color misregistration at four points. FIG. 12B exemplifies pattern images when obtaining amounts of color misregistration at two points. FIG. 12C exemplifies a pattern image when obtaining an amount of color misregistration at one point.

The displayed pattern image suffices to be a pattern on which color misregistration is easily observed. In the first embodiment, the pattern image is a cross-shaped white thin line having a width of several pixels at most (background color is black), but is not limited to this. For example, the pattern image may have a quadrangular shape, triangular shape, or arcuate shape along the corners of the display area. Note that the pattern image is preferably white containing all the three, R, G, and B primary colors.

In general, an aberration appears not at the center near the optical axis but at the periphery in an observation optical system such as the display optical system of the HMD or a vision correction optical system (mainly a spectacle lens). For this reason, the amount of color misregistration is obtained from the periphery, as shown in FIGS. 12A to 12C.

FIG. 12A shows pattern images when obtaining amounts of color misregistration at four points at the periphery of the display area. By obtaining amounts of color misregistration at four or more positions, an accurate amount of color misregistration can be obtained to attain the aberration characteristic of the optical system even for a combination of a complicated display optical system and vision correction optical system.

Note that pattern images are not necessarily simultaneously displayed at four points, but are preferably displayed one by one for each point. After the amount of color misregistration is obtained, the pattern image shifts to the next point and is displayed to the HMD user. The display order is, e.g., 1, 2, 3, and 4 as indicated by numerals and arrows in FIG. 12A. Pattern images displayed one by one can prevent a situation in which the HMD user misses a currently operated pattern image when pattern images are displayed simultaneously at four points. When pattern images are displayed simultaneously at four points, the direction in which color misregistration occurs may differ between the positions, and adjustment (reduction) of the color misregistration at one point may be reflected to, for example, enlarge the color misregistration at another point. In this case, the HMD user may not be able to determine an operation target. This situation can also be avoided by displaying pattern images one by one. Accordingly, the attention of the HMD user can be guided to an operation at one point.

FIG. 12B shows pattern images when obtaining amounts of color misregistration at two points at the periphery of the display area. When the optical system (combination of the display optical system and vision correction optical system) has an optical characteristic symmetrical or almost symmetrical to a vertical or horizontal axis passing through the optical origin, the aberration amount can be calculated at high precision by obtaining amounts of color misregistration at two points. Obtaining amounts of color misregistration at two points can simplify the operation to obtain the amount of color misregistration in practicing the present invention.

FIG. 12C shows a pattern image when obtaining an amount of color misregistration at one point at the periphery of the display area. When the optical system (combination of the display optical system and vision correction optical system) has an optical characteristic rotationally symmetrical to an optical axis passing through the optical origin, the aberration characteristic of the optical system can be calculated satisfactorily by obtaining an amount of color misregistration at one point. Obtaining an amount of color misregistration at one point is effective for a simple optical system. This can further simplify the operation to obtain the amount of color misregistration, compared to obtaining amounts of color misregistration at two points.

Figure 13A:
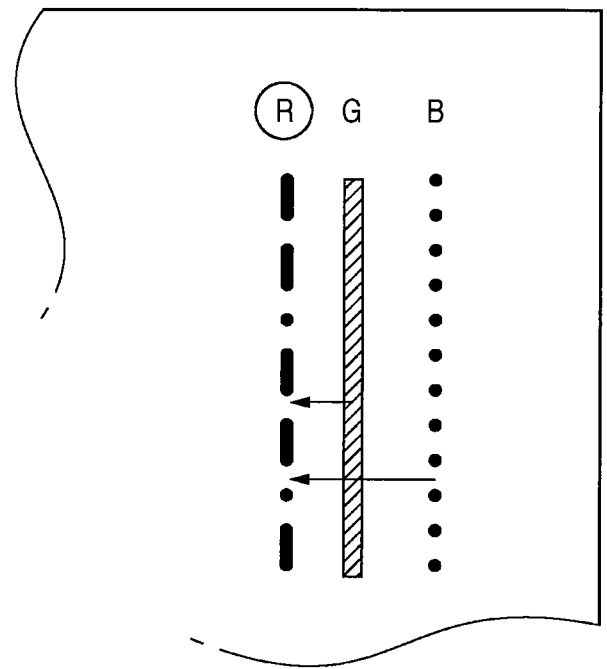
FIGS. 13A and 13B are schematic views for explaining a user operation and determination to obtain the amount of color misregistration in the first embodiment.
Figure 13B:
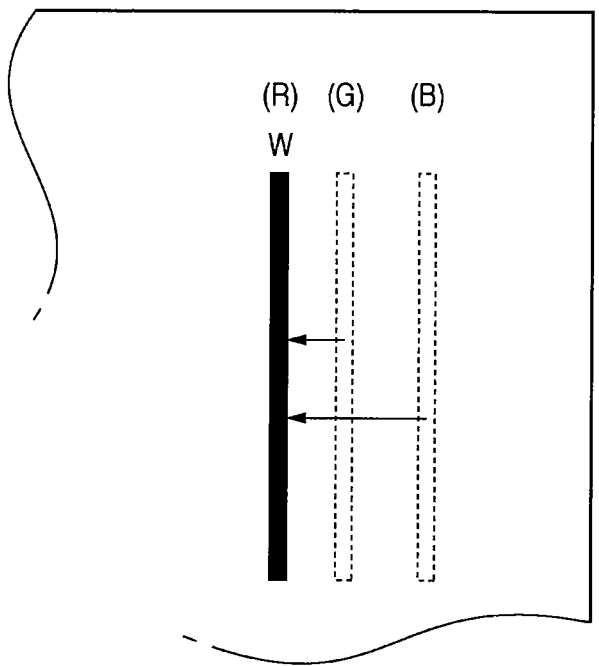

FIGS. 13A and 13B are schematic views for explaining an operation and determination by the HMD user in steps S1103 to S1105 when R is set as the reference in obtaining the amount of color misregistration.

FIG. 13A shows color misregistration generated in a display image when a pattern image is displayed in obtaining the amount of color misregistration. FIG. 13B shows cancellation of the color misregistration by shifting images of the respective colors other than the reference color and superimposing the images of the respective colors by the HMD user.

In FIGS. 12A to 12C, a white cross-shaped pattern image is displayed in the first embodiment to obtain the amount of color misregistration. This is because the cross-shaped pattern has good operability and allows the HMD user to observe amounts of color misregistration in two directions at once. In FIGS. 13A and 13B, a thin line extending vertically is displayed for convenience to obtain the amount of color horizontal misregistration on the display surface. It will readily occur to those skilled in the art that the amount of vertical color misregistration can also be obtained using a thin line extending horizontally, similar to the amount of horizontal color misregistration.

If chromatic aberration is not effectively corrected for a combination of the display optical system of the HMD 201 and the vision correction optical system of the HMD user, the pupil of the HMD user observes color misregistration as shown in FIG. 13A.

This description assumes that R is set as the HMD display mode, i.e., the reference color of aberration correction.

The HMD user shifts images of colors (G and B in this description) except for the reference color against the color misregistration observed as shown in FIG. 13A so that the images of the respective colors overlap each other as shown in FIG. 13B and the HMD user can observe them as a white thin line.

First, the HMD 201 displays a color-separated image of R reference color and a G color-separated image, and prompts the user to perform an image shift operation to move the G color-separated image with respect to the R color-separated image. Then, the HMD 201 displays a B color-separated image, and prompts the user to perform an image shift operation to superimpose the R and B color-separated images.

More specifically, the HMD user performs an image shift operation to superimpose the G image on the R image. When these images overlap each other, the HMD user can observe Y. The HMD user inputs, via the operation apparatus 202, a confirmation that the G and R images overlap each other. Next, the HMD 201 displays the B image, and the HMD user performs an image shift operation to superimpose the B image on the Y image. When these images overlap each other, the HMD user can observe a W image as shown in FIG. 13B. Although a G color-separated image is shifted first in this example, which of images of two colors other than the reference color is shifted first can be arbitrarily set.

The aberration calculating unit 212 determines the image shift amount of each color-separated image at this time and calculates the amount of color misregistration of each color at a pattern image display position from the determined shift amount.

Figure 14:
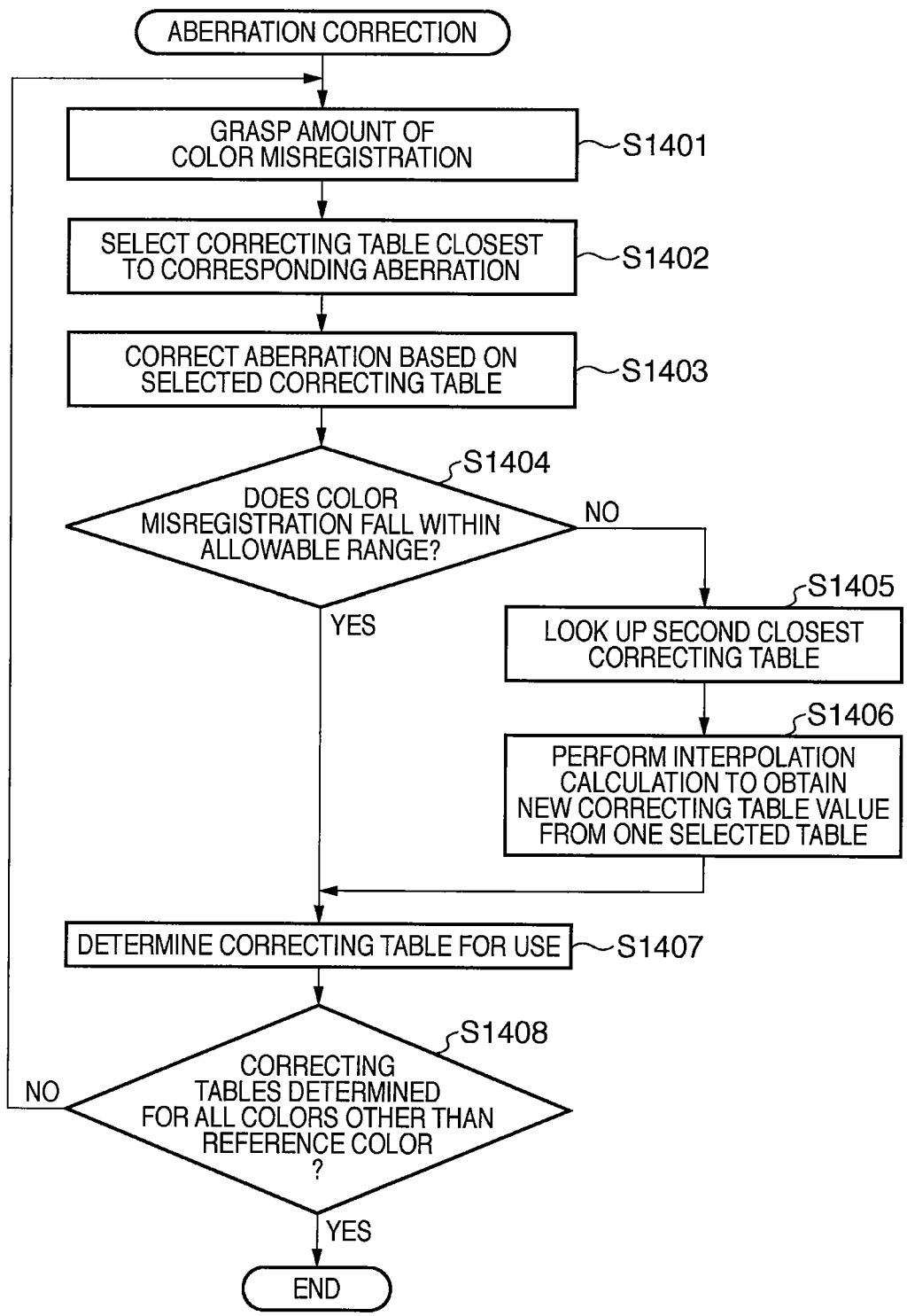
FIG. 14 is a flowchart showing aberration correction processing in the first embodiment.

FIG. 14 is a flowchart showing a detailed sequence of aberration correction in step S706 of FIG. 7 in the first embodiment.

In step S1401, the HMD 201 refers to the amount of color misregistration that has been obtained by the aberration calculating unit 212 and stored in the RAM 502 in step S1106 of FIG. 11. This sequence repetitively executes the processing for the two colors other than the reference color.

In step S1402, the aberration calculating unit 212 selects, from the aberration correction tables 224 prepared in advance in the aberration correction value storage unit 215, a correction table holding an amount (correction amount) of color misregistration to be corrected that is closest to the amount of color misregistration obtained in step S705.

In step S1403, the coordinate transforming unit 214 performs coordinate transformation processing based on the correction table selected in step S1402. The interpolation units 206R, 206G, and 206B calculate new colors at the transformed coordinates. Accordingly, correction effective for the amount of color misregistration is reflected in a display image.

In step S1404, the HMD 201 displays a fine adjustment pattern image (color misregistration amount obtaining images shown in FIGS. 12A and 12B are adopted in the first embodiment). The HMD user determines whether the color misregistration falls within an allowable range as a result of correction based on the selected correction table.

If the HMD user inputs an instruction that the color misregistration falls within the allowable range, the process shifts to step S1407 to determine that the selected correction table is used. If the HMD user inputs an instruction that the color misregistration does not fall within the allowable range, the process shifts to step S1405.

In step S1405, the aberration calculating unit 212 selects a correction table holding a correction amount second closest to the amount of color misregistration obtained in step S705.

For example, a table holding the second closest correction amount is selected as follows. The correction amount of the first correction table has a correction characteristic larger or smaller than the obtained amount of color misregistration. A table which has a correction characteristic opposite to that of the first correction table and also holds a correction amount of color misregistration close to the obtained amount of color misregistration is selected as the second table. For example, when the correction characteristic of the first table is excessive (the correction amount is larger than the obtained amount of color misregistration), a table having a weak correction characteristic (the correction amount is smaller than the obtained amount of color misregistration) and a correction amount of color misregistration closest to the obtained amount of color misregistration is selected as the second table.

In this fashion, two correction tables having close correction amounts on either side of or sandwiching the obtained amount of color misregistration are selected.

In step S1406, the aberration calculating unit 212 executes correction value interpolation calculation to interpolate the two correction tables. The update memory 216 stores the calculation result. Consequently, an optimal correction table is newly created. Details of the calculation method will be described later.

In step S1407, the HMD 201 determines that the selected or newly generated correction table is used, and sets it in the coordinate transforming unit 214.

In step S1408, the HMD 201 determines whether correction tables used for two colors other than the reference color have been determined. If correction tables used for two colors have been determined, the process ends. If correction tables used for two colors other than the reference color have not been determined, the process returns to step S1401 to repeat the foregoing processing.

By this processing, a correction table appropriate for color misregistration and distortion generated by a combination of the display optical system of the HMD and a vision correction optical system used by the HMD user can be prepared. A newly created correction table can also be managed and reused for each HMD user. For example, a newly created correction table may be stored in correspondence with each observer to reuse the stored correction table.

Figure 15A:
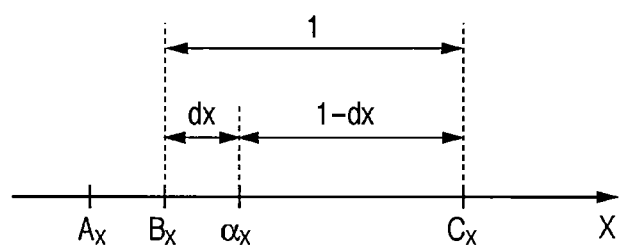
FIGS. 15A and 15B are schematic views for explaining interpolation calculation processing for aberration correction in the first embodiment.
Figure 15B:
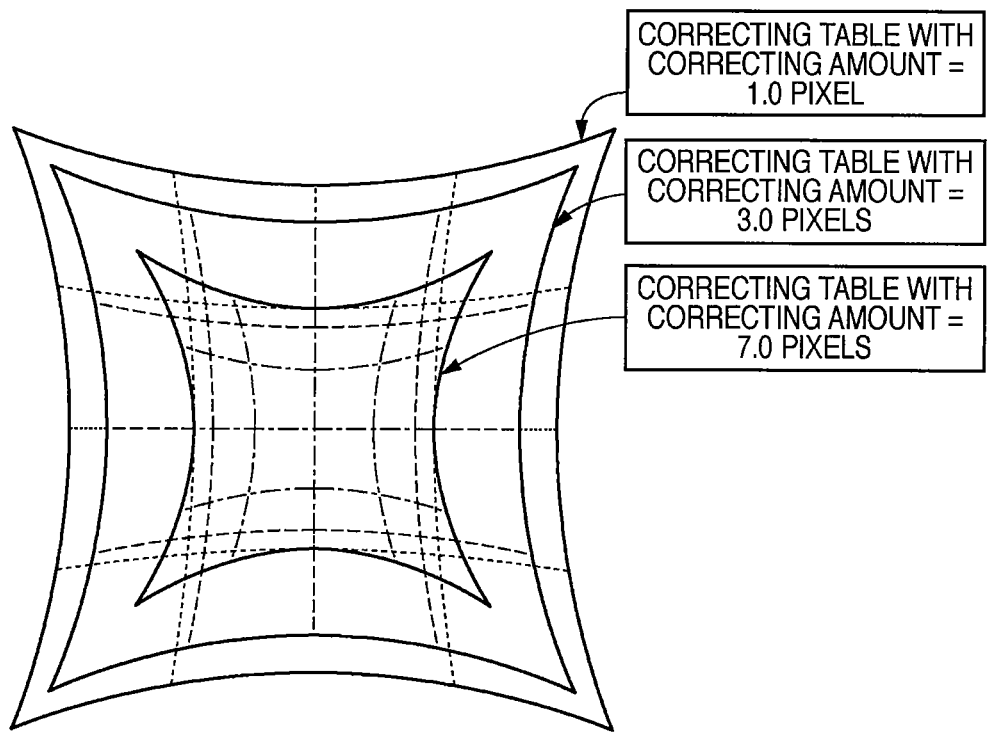

FIGS. 15A and 15B are schematic views for explaining interpolation calculation processing in S1406 for aberration correction in the first embodiment.

FIG. 15A shows the interpolation calculation method. FIG. 15B shows the correspondence between a correction table in the aberration correction tables 224 and its correction amount (amount of color misregistration to be corrected).

The first embodiment will explain the simplest linear interpolation method as the interpolation calculation method. A correction table has two-dimensional, horizontal and vertical values on the display surface. However, a one-dimensional (x direction) value will be explained for descriptive convenience (a suffix "x" in FIG. 15A means an x correction value).

In FIGS. 15A, A, B, and C represent the correction amounts of correction tables prepared in advance, and α represents an obtained amount of color misregistration.

A correction table B has a correction amount closest to the obtained amount α of color misregistration. A correction table A has a correction amount second closest to α. However, the correction tables A and B have the same correction characteristic (correction is weak) with respect to α. Thus, a correction table C is selected as a table having the second closest correction amount, as described in step S1405.

A correction value optimum for the amount a of color misregistration to be corrected falls between the correction values B and C. By using the tables B and C, an optimum correction value is newly generated by linear interpolation calculation. First, the difference between the B and C values is normalized, and the difference between B and α is defined as dx.

Correction amounts appropriate for the obtained amount α of color misregistration can be calculated using the defined values:

$$\alpha_x = B_x(1-dx) + C_x dx$$

$$\alpha_y = B_y(1-dy) + C_y dy \quad (1)$$

In FIG. 15A, a one-dimensional (x direction) linear interpolation method is employed, but the correction table has two-dimensional values. Hence, the above-described linear interpolation processing is also performed in the y direction, achieving bilinear interpolation calculation. In addition, many interpolation methods are known, including nearest neighbor interpolation, bicubic interpolation, and Lagrange interpolation. Any known interpolation method may be used.

FIG. 15B exemplifies correction tables corresponding to an aberration as shown in FIG. 6C. A correction table and an amount of color misregistration to be corrected based on the correction table are stored in the aberration correction tables 224 in correspondence with each other. Values "1.0 pixel", "3.0 pixels", and "7.0 pixels" shown in FIG. 15B are the correction amounts (amounts of color misregistration to be corrected) of respective tables at a color misregistration amount obtaining position. These values are the representative values of the respective tables. A series of processes described above can be executed by associating an obtained amount of color misregistration and a correction table.

FIG. 16 is a flowchart showing a detailed sequence of fine adjustment in step S709 of FIG. 7 in the first embodiment.

It is expected that almost appropriate aberration correction has been executed for the amount of color misregistration before the process shifts to fine adjustment in this sequence. However, a small image misregistration may occur, so final adjustment is done by performing resolution conversion (magnification change) and image shift for an image of each color.

In step S1601, the pattern image generating unit 217 of the HMD 201 generates a pattern image for fine adjustment, and the image display unit 209 displays it for one eye. No image is displayed for the other eye, and the adjustment is executed for each eye. The displayed pattern image will be explained with reference to FIGS. 12A and 12B.

In step S1602, the image adjusting unit 208 executes resolution conversion processing for images of colors other than the reference color in the corrected image, based on an instruction input to the operation unit 219 by the HMD user. When R is set as the reference color, the HMD 201 first displays R and G images to prompt the HMD user to perform a resolution conversion operation (image scaling operation) for the G image. Then, the HMD 201 displays R, G, and B images to prompt the HMD user to perform the resolution conversion operation for the B image. When the HMD user performs the resolution conversion operation to superimpose the G image (color-separated image) on the R image (color-separated image), he observes Y upon the superimposition. The HMD user inputs, via the operation apparatus 202, a confirmation that the G and R images overlap each other. Then, the HMD 201 displays the B image. When the HMD user performs the resolution conversion operation to superimpose the B image on the Y image, he observes W upon the superimposition.

In step S1603, the HMD 201 prompts the HMD user to determine whether the color misregistration falls within an allowable range at this time. If the HMD user determines that the color misregistration falls within the allowable range, he inputs this determination via the operation apparatus 202, and the process shifts to step S1604. If the HMD user determines that the color misregistration does not fall within the allowable range, he inputs this determination via the operation apparatus 202, and the HMD 201 repetitively executes the fine adjustment by the resolution conversion operation (step S1602).

In step S1604, the image adjusting unit 208 executes shift processing for images (color-separated images) of two colors other than the reference color in the corrected image, based on an instruction input to the operation unit 219 by the HMD user.

In step S1605, the HMD 201 prompts the HMD user to shift the color-separated image and determine whether the color misregistration falls within an allowable range. If the color misregistration falls within the allowable range, the HMD user inputs this determination via the operation apparatus 202, and the process shifts to step S1606. If the color misregistration does not fall within the allowable range, the user inputs this determination via the operation apparatus 202, and the process returns to step S1602 to repetitively execute the fine adjustment. Also when the fine adjustment has not performed for both eyes, it is repeated.

In step S1606, the HMD 201 determines whether the fine adjustment has been performed for all the colors other than the reference color. If the fine adjustment has ended for all the colors other than the reference color, the process ends. If there is a color which has not yet undergone the fine adjustment, except for the reference color, the process returns to step S1601 to repeat the fine adjustment processing.

The image adjusting unit 208 notifies the correction value adjusting unit 218 of the adjustment based on resolution conversion and image shift executed in the foregoing processing. The correction value adjusting unit 218 adjusts the correction value based on the adjustment value, and reflects the adjustment result in an adjusted correction table in the update memory 216.

By this processing, fine adjustment based on resolution conversion and image shift can be achieved.

A pattern image displayed in fine adjustment can be a pattern image used to obtain the amount of color misregistration, as shown in FIGS. 12A and 12B. More specifically, fine adjustment based on displays at four points employs pattern images as shown in FIG. 12A. Fine adjustment based on displays at two points employs pattern images as shown in FIG. 12B.

In obtaining the amount of color misregistration, pattern images need to be displayed sequentially at respective color misregistration amount obtaining positions to perform an operation. In fine adjustment, all patterns are displayed simultaneously to adjust the magnification (resolution conversion) and image position.

For example, when R is the reference color, R and G images are displayed to prompt the HMD user to perform a fine adjustment operation for the G image. Then, R, G, and B images are displayed to prompt the HMD user to perform the fine adjustment operation for the B image. This is the same as that in obtaining the amount of color misregistration. At this time, the order of G and B may be reversed.

The displayed pattern image suffices to be a pattern on which color misregistration is easily observed. In the first embodiment, the pattern image is a cross-shaped white line having a width of several pixels at most, but suffices to have a shape which allows the HMD user to confirm generation of color misregistration at the periphery. For example, the pattern image may have a quadrangular shape extending over the entire display surface. Note that the pattern image is desirably white containing all the three, R, G, and B primary colors.

The first embodiment provides an arrangement and method for grasping the amount of color misregistration observed by the HMD user and correcting an aberration based on the amount. A correction value corresponding to a correction amount closest to the observed amount of color misregistration can be selected. If correction by the closest correction value is not sufficient, the second closest correction value is further selected. A correction value can be newly generated by interpolation calculation based on the two correction values. Accordingly, appropriate aberration correction can be executed for color misregistration (aberration) generated by a combination of the display optical system of the HMD and a vision correction optical system used by the HMD user.

A correction table can be selected or newly generated for each HMD user. The correction table can be stored so that aberration correction settings can be read for each user next time the HMD is used.

A correction table appropriate for each user can be newly created from correction tables prepared in advance. It suffices to prepare correction tables at relatively large intervals in advance, reducing the memory capacity required to store the correction tables.

As described above, according to the first embodiment, the image display apparatus which enlarges and displays a display image formed on the display device can correct an aberration properly for each observer in accordance with whether the observer uses a vision correction optical system, and the degree of vision correction. Every observer of the image display apparatus can thus observe an aberration (color misregistration)-free image.

Second Embodiment

The second embodiment will be described with reference to the accompanying drawings.

In the first embodiment, if in S1404 the color misregistration does not fall within an allowable range then in S1405 and S1406 two correction values corresponding to correction amounts close to an obtained amount of color misregistration are selected from aberration correction values (correction tables) prepared in advance. A new correction value is newly generated by interpolation calculation of the two correction values, and then appropriate aberration correction is executed. In the second embodiment, a new correction value is generated based on one aberration correction value (a correction table or a parameter table of an approximate polynomial), and proper correction is performed. While maintaining the same correction precision as that in the first embodiment, the second embodiment reduces a necessary memory by decreasing the number of aberration correction values prepared in advance. The second embodiment will be described with respect to this feature.

The functional blocks of an HMD 201 in the second embodiment are the same as those (FIG. 2) in the first embodiment, and a description thereof will not be repeated. As described above with respect to the first embodiment, the HMD may comprise the image display unit 209 whilst the image processing apparatus 103 comprises all of the remaining functional units of the HMD 201, as illustrated in FIG. 2. The image processing apparatus 103 thus has the aberration correction function. In such a case the HMD will comprise an image receiving interface for receiving corrected images from the image processing apparatus 103. Correspondingly the image processing apparatus 103 will have an image transmitting interface for transmitting the corrected images output by image adjusting unit 208 to the HMD. In the first embodiment, the aberration correction value storage unit 215 stores aberration correction tables 224. However, in the HMD 201 according to the second embodiment, an aberration correction value storage unit 215 stores only one table holding the default values of the coefficient parameters of an approximate polynomial for correction. This table provides a reference value for obtaining a correction value to correct an aberration generated by the display optical system of the HMD 201.

The table is not limited to one table for observation with naked eyes, and may include tables assuming short-sight correction and long-sight correction. Before executing aberration correction processing in the second embodiment, the HMD user is prompted to select one of these tables. The correction value (parameter table) need not be updated greatly, increasing the correction precision.

The overall sequence in the second embodiment is the same as the flowchart of FIG. 7 in the first embodiment. However, the contents of aberration correction processing in step S706 are different from those in the first embodiment. In the first embodiment, aberration correction processing is accompanied by an instruction (reflecting the determination of whether color misregistration has been corrected satisfactorily using the first table) by the HMD user. In the second embodiment, aberration correction processing does not require an instruction by the HMD user.

Figure 17A:
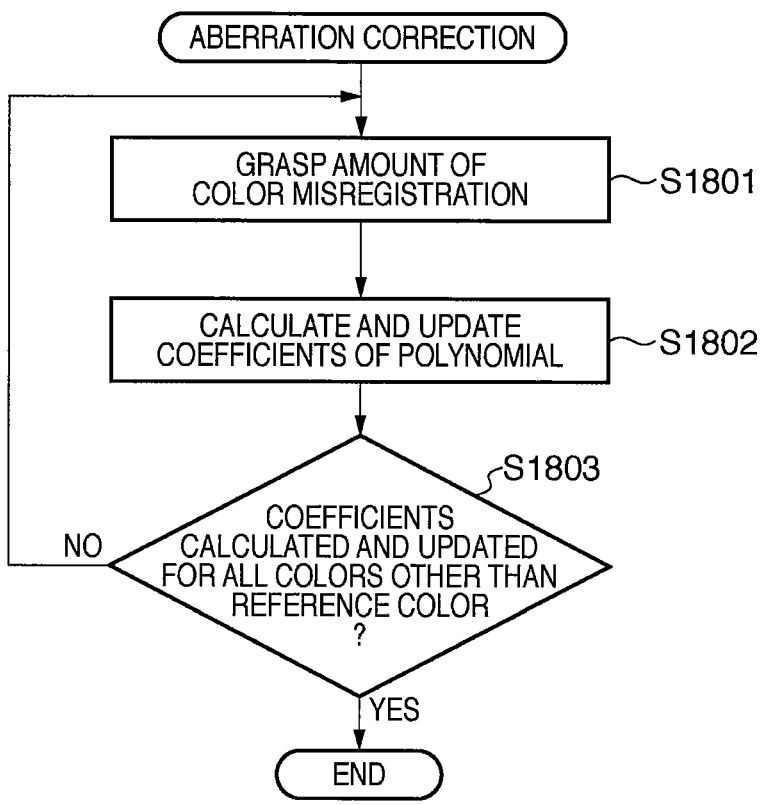
FIG. 17A is a flowchart showing aberration correction processing in the second embodiment.

FIG. 17A is a flowchart showing a detailed sequence of aberration correction in step S706 in the second embodiment.

In step S1801, an aberration calculating unit 212 refers to the amount of color misregistration stored in a RAM 502 in step S1106 of FIG. 11.

In step S1802, the aberration calculating unit 212 updates a parameter table by calculating the coefficient parameters of an approximate polynomial for correction based on a pixel position from which the amount of color misregistration was obtained, and the amount of color misregistration. The calculation method will be described with reference to FIG. 17B.

In step S1803, the HMD 201 determines whether parameters have been updated for the two colors other than the reference color. If parameters have been updated for the two colors other than the reference color, the process ends; if they have not been updated, the process returns to step S1801 to repeat the foregoing processing.

By this processing, a parameter table for a correction approximate polynomial is newly created based on the amount of color misregistration generated by a combination of the display optical system of the HMD 201 and a vision correction optical system used by the HMD user. Similar to the first embodiment, the newly created correction reference value can be stored together with information for specifying an individual, and applied to each HMD user.

Figure 17B:
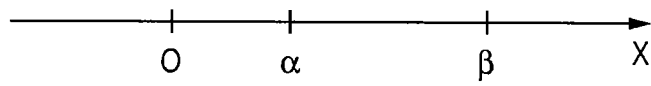
FIG. 17B is a schematic view for explaining an aberration correction method in the second embodiment.

FIG. 17B is a schematic view for explaining the aberration correcting method in step S1802 in the second embodiment. FIG. 17B exemplifies the relationship between a correction amount based on an approximate polynomial prepared in advance, and the obtained amount of color misregistration.

In FIG. 17B, 0 represents an image forming position free from any aberration, and this position is defined as a reference point. α represents the correction amount (amount of color misregistration to be corrected) of the approximate polynomial of default parameters at specific coordinates. β represents the amount of color misregistration generated by a combination of the display optical system of the HMD 201 and the vision correction optical system at the same coordinates. The α value is updated to the β value using the obtained amount of color misregistration, thereby updating the correction amount to a proper one. For descriptive convenience, a one-dimensional (x direction) correction value will be explained (a suffix "x" means the x direction in the following equations).

In the second embodiment, an approximate polynomial in the x direction is $$A_x = \alpha x^s + \alpha_2 x^{s-1} + \ldots + \alpha_{x-2} x^2 + \alpha_x x + \alpha_{x+1} \qquad (2)$$

The coefficients of the respective terms determine a correction amount at arbitrary coordinates. The aberration correction value storage unit 215 stores the coefficients of the respective terms as correction parameters in the table. $A_x$ in equation (2) represents a correction amount at arbitrary coordinates by using default parameters.

An appropriate correction amount $A_x'$ at arbitrary coordinates is calculated from the correction amount $A_x$ at arbitrary coordinates using the ratio of the correction amount α and the amount β of color misregistration at a specific position:

$$A_x' = \frac{\beta}{\alpha} A_x \qquad (3)$$

Using equation (3), the updated parameter of the approximate polynomial can be calculated.

When the correction amount α and the amount β of color misregistration at a specific position are related to each other at the ratio of a specific function with respect to the correction amount $A_x$ at arbitrary coordinates, an appropriate correction amount $A_x'$ at arbitrary coordinates is calculated using the functional relation:

$$A_x' = \frac{g(\beta)}{f(\alpha)} A_x \quad (4)$$

Using equation (4), the updated parameter of the approximate polynomial can be calculated.

Note that the second embodiment updates the parameter table of the approximate polynomial. Similarly, a correction value in a general aberration correction table can be updated from the relationship between a correction value held in the correction table and the amount of color misregistration at specific coordinates.

According to the second embodiment, the aberration correction value storage unit 215 suffices to store one or several correction values in advance, reducing the memory capacity. A smaller memory capacity contributes to reducing the number of chips and the substrate area, and implements a lower cost.

Third Embodiment

The third embodiment will be described with reference to the accompanying drawings. In the first and second embodiments, aberration correction is executed for each user by newly generating a correction value from aberration correction values prepared in advance, based on the obtained amount of color misregistration. In the third embodiment, an optimum aberration correction value is selected from aberration correction values prepared in advance to perform correction. The third embodiment can downsize the circuit without any complicated calculation. The third embodiment does not require an operation to obtain the amount of color misregistration, and can simplify a operation by the HMD user according to the embodiment. The third embodiment will be described mainly with respect to this feature.

Figure 18:
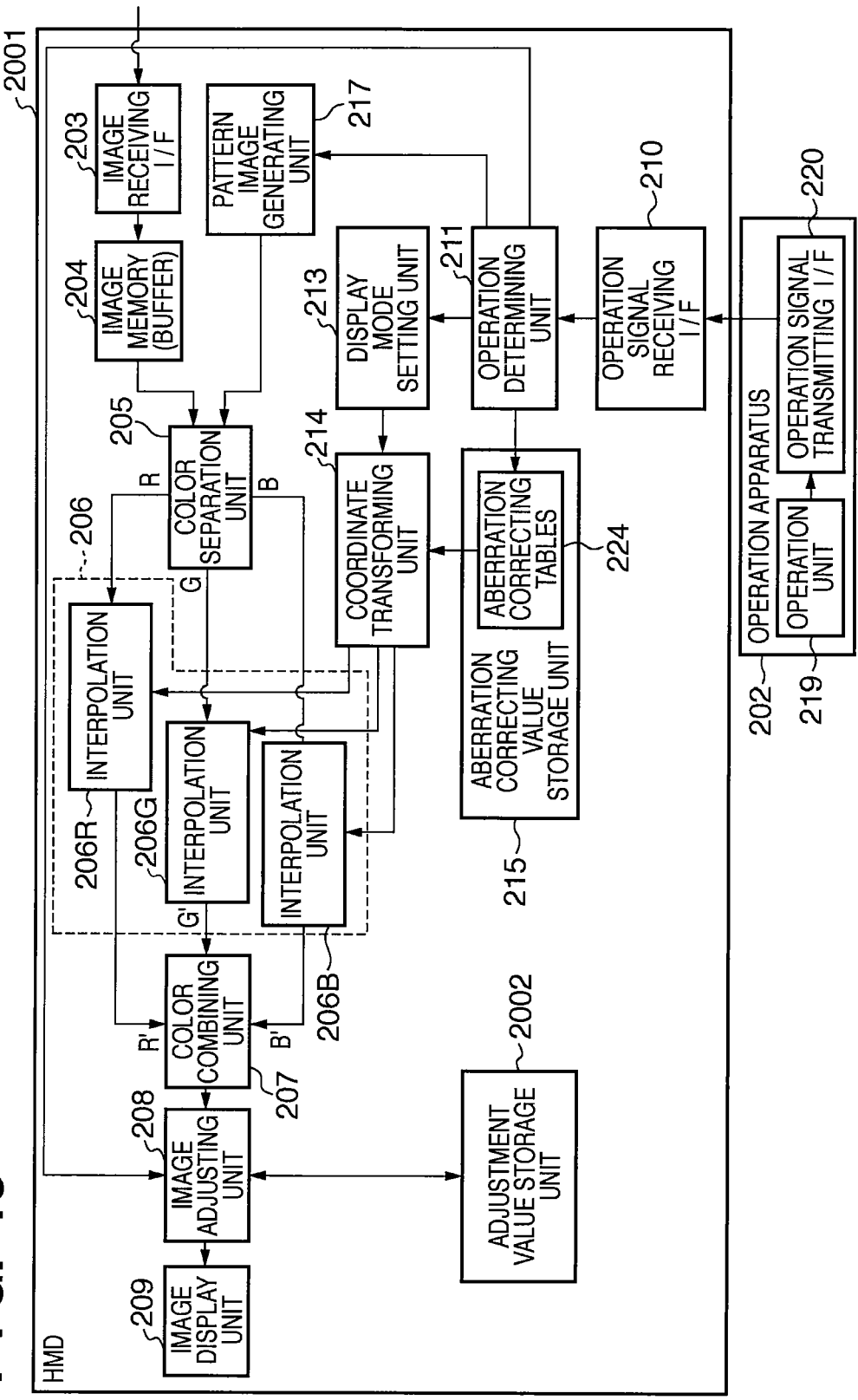
FIG. 18 is a block diagram exemplifying the functional configuration of an HMD in the third embodiment.

FIG. 18 is a functional block diagram of an HMD in the third embodiment. An image processing apparatus 103 is the same as that in the first embodiment, and is consequently not illustrated. In a further embodiment the HMD may comprise the image display unit 209 whilst the image processing apparatus 103 comprises all of the remaining functional units of the HMD 2001, as illustrated in FIG. 18. The image processing apparatus 103 thus has the aberration correction function. In such a case the HMD will comprise an image receiving interface for receiving corrected images from the image processing apparatus 103. Correspondingly the image processing apparatus 103 will have an image transmitting interface for transmitting the corrected images output by image adjusting unit 208 to the HMD.

The third embodiment does not newly create a correction value from aberration correction values prepared in advance. For this reason, unlike the HMD 201 in the first and second embodiments, the third embodiment does not require an update memory 216 and a correction value adjusting unit 218 which reflects the adjustment value of an image adjusting unit 208 in a new correction value in the update memory 216.

An aberration correction value storage unit 215 stores aberration correction tables 224 having different correction amounts prepared in advance. The aberration correction tables 224 are preferably prepared at small intervals to achieve optimal correction based on a prepared aberration correction table. One of the prepared aberration correction tables is selected in accordance with an instruction from an operation determining unit 211. A coordinate transforming unit 214 calculates the transformed coordinates of each color based on the selected correction table.

An adjustment value storage unit 2002 stores a value adjusted by the image adjusting unit 208 upon resolution conversion, image shift, and the like. Since no correction value is newly created, the adjustment value of the image adjusting unit 208 is stored in the adjustment value storage unit 2002. When reading past stored data in the next use, the past adjustment value from the adjustment value storage unit 2002 is reflected in the image adjusting unit 208. The first and second embodiments adjust and update a correction value based on the adjustment value. The third embodiment neither newly creates nor updates a correction value, but stores an adjusted value to reuse settings.

In the third embodiment, an HMD 2001 includes the aberration correction value storage unit 215. Alternatively, the image processing apparatus 103 may include the aberration correction value storage unit 215, similar to the functional blocks in FIG. 2. Also, an external memory or external medium may function as the aberration correction value storage unit 215.

With this arrangement, the HMD can obtain an aberration-corrected display image and allows the HMD user to correctly observe it.

Figure 19:
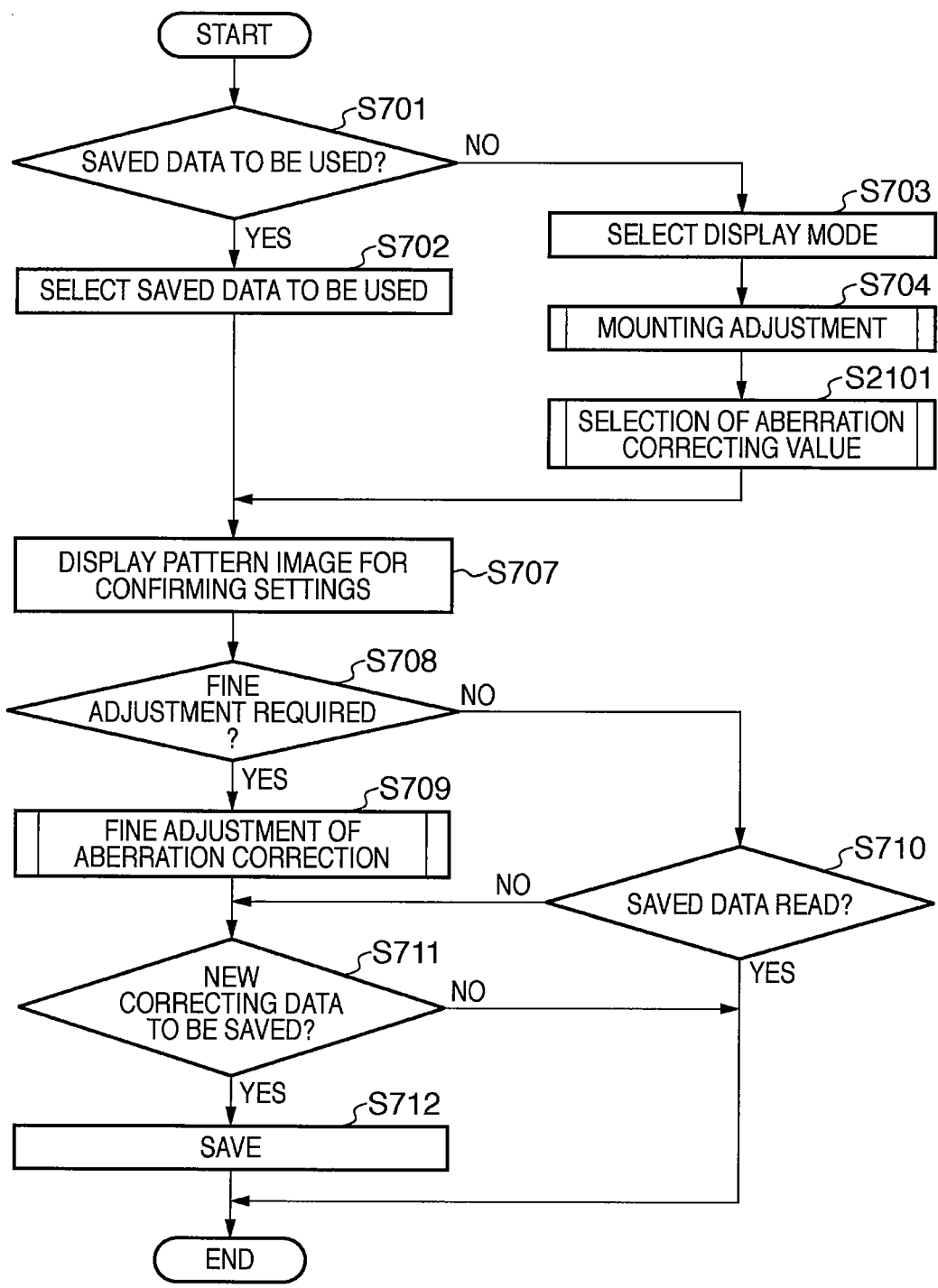
FIG. 19 is a main flowchart showing an overall processing sequence in the third embodiment.

FIG. 19 is a main flowchart showing an overall sequence in the third embodiment.

In the third embodiment, obtainment of the amount of color misregistration in step S705 and aberration correction processing in step S706 are omitted from the flowchart of FIG. 7 in the first embodiment. Instead, aberration correction value selection processing in step S2101 is added.

In step S2101, an optimum correction table is selected from the aberration correction tables 224 stored in the aberration correction value storage unit 215. Details of this processing will be explained with reference to FIG. 20.

Figure 20:
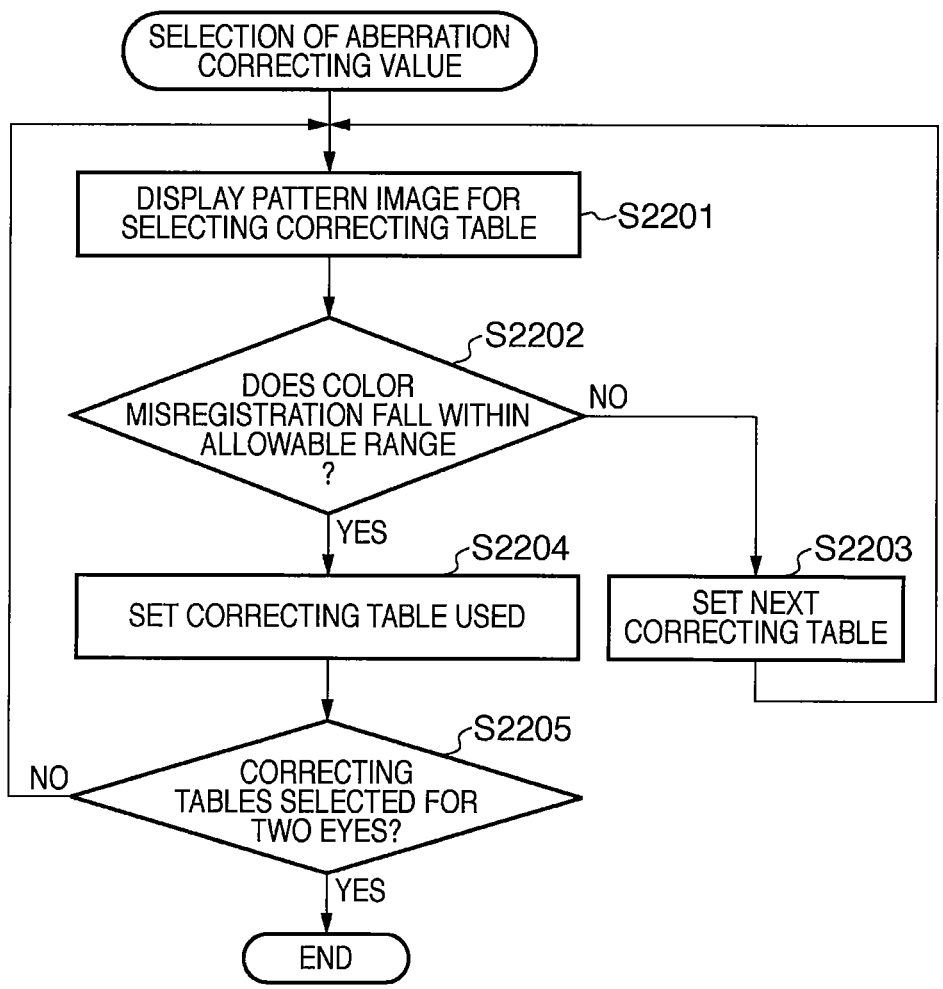
FIG. 20 is a flowchart showing aberration correction table selection processing in the third embodiment.

FIG. 20 is a flowchart showing a detailed sequence of aberration correction value selection in step S2101 in the third embodiment.

In step S2201, a pattern image generating unit 217 generates a pattern image for selecting a correction table, and an image display unit 209 displays it for one eye. No image is displayed for the other eye, and a correction value is selected for each eye. The displayed pattern image in the third embodiment suffices to be the same as the fine adjustment pattern image (FIGS. 12A and 12B) in the first embodiment.

In step S2202, the HMD 2001 prompts the HMD user to confirm whether the display image is free from color misregistration and the color misregistration is allowable. If the user determines that the color misregistration is not allowable, the process shifts to step S2203. If the color misregistration falls within the allowable range, the process shifts to step S2204.

In step S2203, the color misregistration does not fall within the allowable range based on the currently selected correction table. Hence, the next correction table is set from the aberration correction tables 224 stored in the aberration correction value storage unit 215. Then, step S2201 is repeated.

The "next" correction table is set in this case, and decided as follows. More specifically, an ID is assigned to each of the aberration correction tables 224, and a correction table having an adjacent ID is set. A correction table having an ID adjacent to the current one may be selected automatically (arbitrarily in ascending or descending order), or a correction table may be selected by a user via an operation unit 219 of an operation apparatus 202. When automatically selecting a correction table, all the tables need to be targeted once before returning to the same correction table. When a correction table is operable, correction tables having adjacent IDs can be compared repetitively. A list of aberration correction tables may be displayed on the display to allow the user to select one of them. Selection of a table by the user may be assisted by displaying the index of the correction amount and the like together with the list.

Upon selection, correction by the selected table is reflected, and the user presses the OK button to decide a correction table for use. More specifically, if the user checks the screen reflecting correction by the selected table and determines that color misregistration falls within an allowable range, he presses the OK button. The process then advances to step S2204. If the user determines that the color misregistration does not fall within the allowable range, he performs an operation to, e.g., select the next table. The process advances to step S2203.

In step S2204, a correction table which cancels color misregistration or makes it fall within the allowable range has been selected by the preceding processing. The correction table is set for use in the coordinate transforming unit 214.

In step S2205, the HMD 2001 determines whether correction tables have been decided for the two eyes. If correction tables have been decided for the two eyes, the process ends. If correction tables have not been decided for the two eyes, the process returns to step S2201 to select and decide a correction table for the other eye.

By this processing, tables for correction color misregistration generated by a combination of the display optical system of the HMD and a vision correction optical system used by the HMD user can be selected and decided for the two eyes.

Processes in step S707 and subsequent steps are the same as those in the first embodiment. In step S712, the HMD 2001 stores an adjustment value upon resolution conversion, image shift, and the like in the adjustment value storage unit 2002. At this time, the adjustment value is recorded in correspondence with the user ID. By inputting the user ID, an adjustment value corresponding to the user can be acquired. In step S702 of the third embodiment, saved data for use is obtained from the adjustment value storage unit 2002.

As described above, the third embodiment can eliminate complicated calculation and downsize the circuit. Also, the third embodiment does not require an operation to obtain the amount of color misregistration, and can simplify the operation by the HMD user in practicing the present invention. A smaller circuit scale results in lower power consumption.

Fourth Embodiment

The fourth embodiment of the present invention will be described with reference to the accompanying drawings.

The first to third embodiments correct aberrations for each eye on image displays for the two eyes on the HMD. The fourth embodiment corrects aberrations using symmetry of a pair of display optical systems arranged for the two, right and left eyes in the HMD.

Optical systems having the same optical characteristic are generally applied as display optical systems arranged for the two, right and left eyes in an HMD or the like. The optical characteristic is symmetrical about a vertical axis passing through a position between the eyes of the HMD user. In the fourth embodiment, the vision correction optical systems of the HMD user are regarded as symmetrical. By using the symmetry of the display optical systems of the HMD, a correction value set for one eye is reflected for the other eye.

The fourth embodiment can therefore reduce the calculation count if the vision correction optical system does not greatly differ between the right and left eyes. In addition, the fourth embodiment can simplify a complicated operation by the HMD user in practicing the present invention. The fourth embodiment will be explained mainly with respect to this feature.

The fourth embodiment is applicable to both the HMD 201 in the first or second embodiment and the HMD 2001 in the third embodiment. The fourth embodiment will be described based on the first embodiment. The functional blocks are the same as those (FIG. 2) in the first embodiment. In a further embodiment the HMD may comprise the image display unit 209 whilst the image processing apparatus 103 comprises all of the remaining functional units of the HMD 201, as illustrated in FIG. 2. The image processing apparatus 103 thus has the aberration correction function. In such a case the HMD will comprise an image receiving interface for receiving corrected images from the image processing apparatus 103. Correspondingly the image processing apparatus 103 will have an image transmitting interface for transmitting the corrected images output by image adjusting unit 208 to the HMD.

Figure 21:
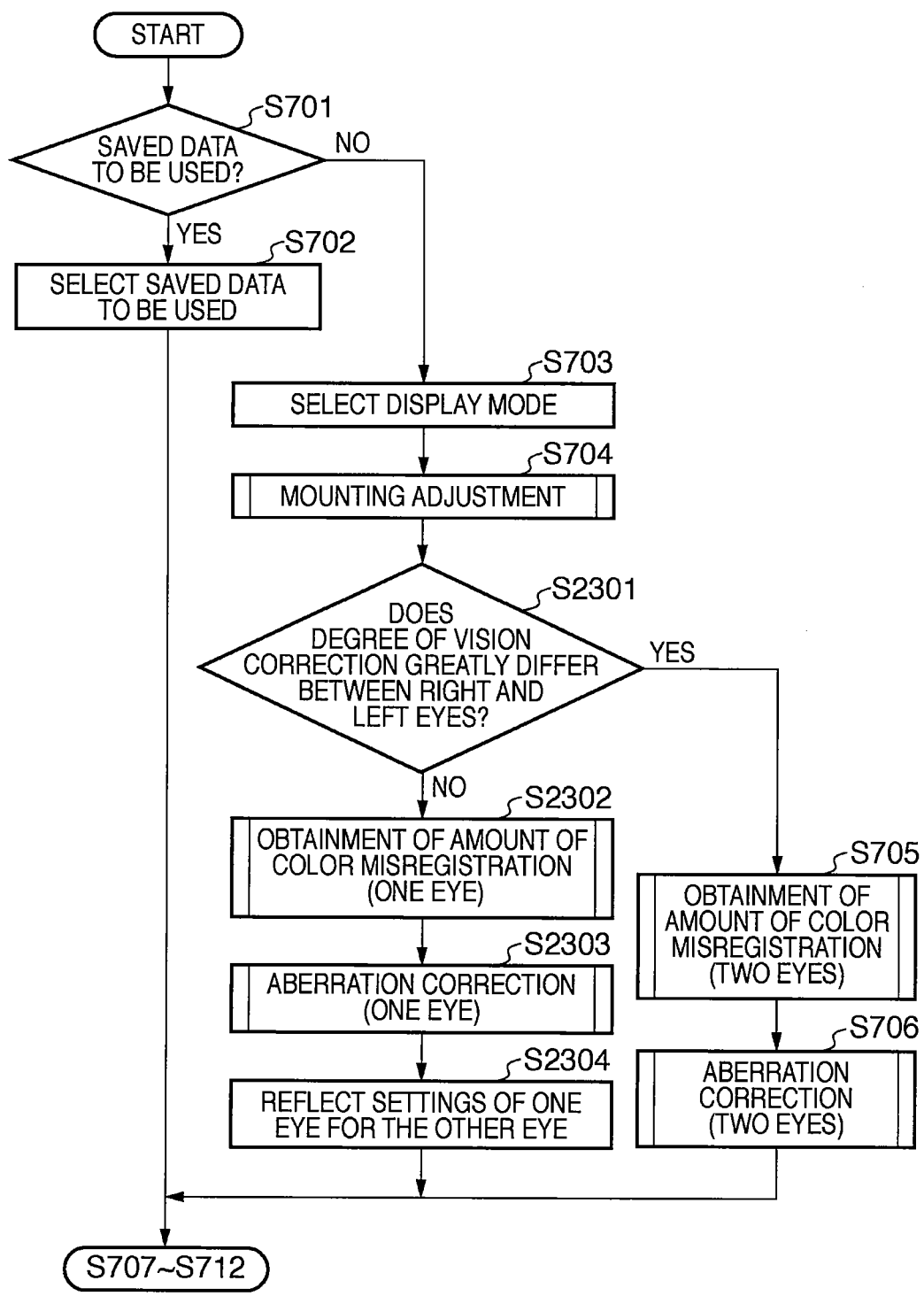
FIG. 21 is a main flowchart showing an overall processing sequence in the fourth embodiment.

FIG. 21 is a main flowchart showing an overall sequence in the fourth embodiment. Since steps S707 to S712 are same as those of FIG. 7, the steps S707 to 712 are not shown in FIG. 21.

The fourth embodiment adds, to the flowchart of FIG. 7 in the first embodiment, step S2301 to determine the difference in vision correction between the right and left eyes, and step S2304 to reflect settings for one eye in those for the other eye. Although step S2302 to obtain the amount of color misregistration and step S2303 to perform aberration correction are also added, the processes in these steps are the same as those in steps S705 and S706. In steps S2302 and S2303, the processes are done for only one eye.

In step S2301, an HMD 201 asks the HMD user whether the vision or the degree of vision correction of a vision correction optical system (mainly a spectacle lens) is greatly different between the right and left eyes. If the HMD user replies that the degree of vision correction greatly differs between the right and left eyes or selects to adjust correction values individually for the two, right and left eyes, the process shifts to step S705 to execute the same processing as that in the first or second embodiment. The HMD user replies by inputting an instruction via an operation apparatus 202. If the HMD user replies that the degree of vision correction does not greatly differ between the right and left eyes, the process shifts to step S2302.

In step S2302, the amount of color misregistration is obtained for one eye (right or left eye) according to the flowchart of FIG. 11. Since only one eye is targeted, the process is not repeated in step S1107.

In step S2303, an aberration is corrected for one eye according to the flowchart of FIG. 14. Since only one eye is targeted, the process is not repeated in step S1408.

In step S2304, appropriate aberration correction has been determined for one eye by the preceding processing, and the determined value (correction value) is also reflected and determined for the other eye. Needless to say, the correction value is reflected in consideration of axial symmetry. As for reflection considering axial symmetry, two tables for the right and left eyes may be arranged in advance as correction tables in consideration of axial symmetry. Calculation may be done using a correction table for one eye based on symmetry, generating a correction table for the other eye.

The particular eye subjected to obtainment of the amount of color misregistration (step S2302) and aberration correction (step S2303) in the fourth embodiment may be fixed as either the right or left eye. Alternatively, the HMD user may be prompted to select one of the right and left eyes before, e.g., step S2302. Aberration correction value selection processing (step S2101) described in the third embodiment is also applicable to the fourth embodiment. More specifically, the aberration correction value selection processing (step S2101) is executed for only one eye, and the processing result is reflected for the other eye.

As described above, the fourth embodiment can simplify a complicated operation by the HMD user in practicing the present invention, in consideration of symmetry of vision correction optical systems (mainly spectacle lenses) used by the HMD user for the right and left eyes. When the symmetry can be used effectively, the fourth embodiment can halve the operation amount to obtain the amount of color misregistration, compared to the first embodiment.

Fifth Embodiment

The fifth embodiment of the present invention will be described with reference to the accompanying drawings.

The first to fourth embodiments correct aberrations based on the amount of color misregistration observed by the pupil of the HMD user.

The fifth embodiment has a feature of using an optical sensor to measure an aberration generated by a vision correction optical system used by the HMD user. An aberration correction table is selected based on the measurement result. This can further simplify a complicated operation by the HMD user in practicing the present invention.

Figure 22:
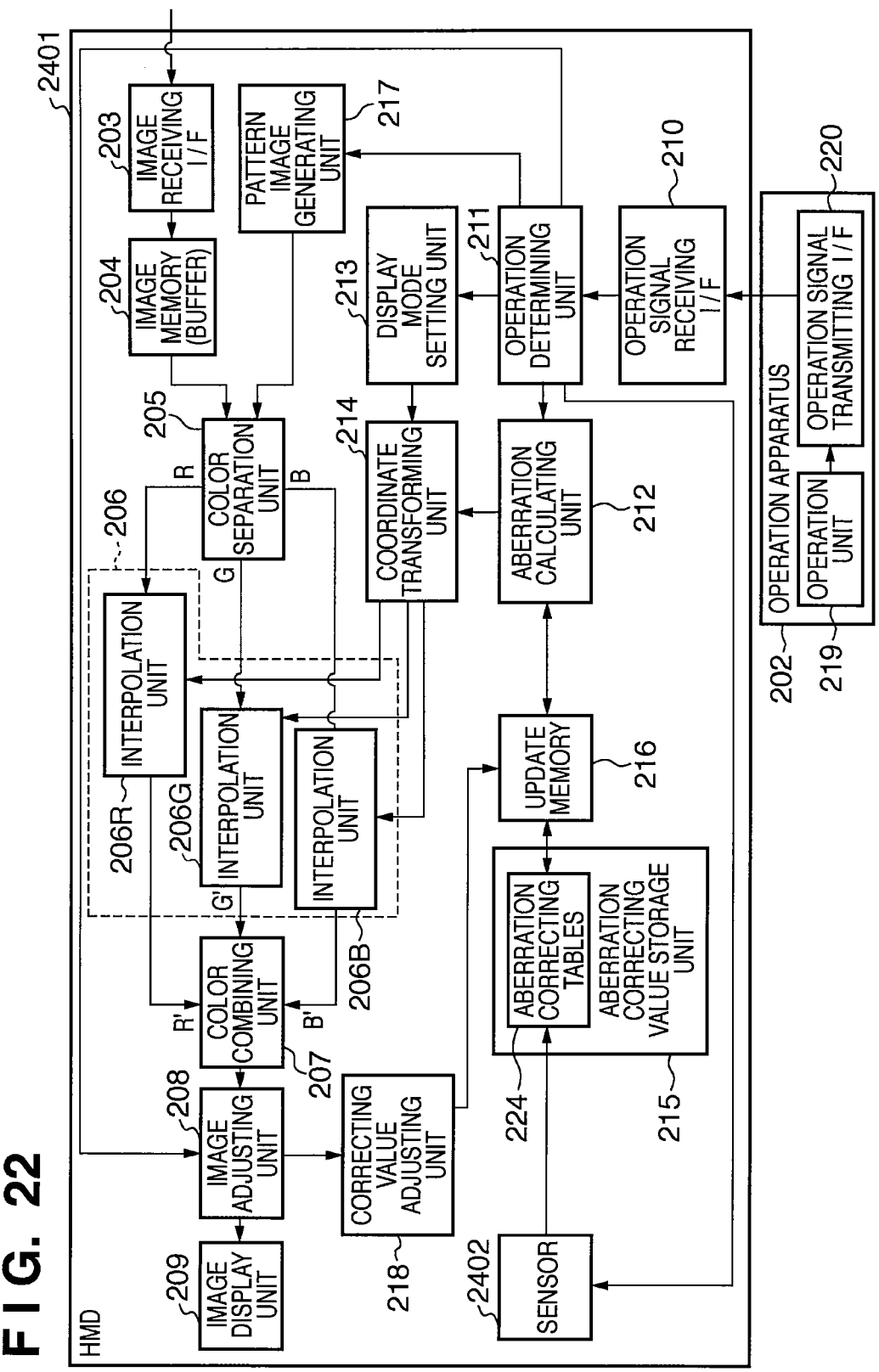
FIG. 22 is a block diagram exemplifying the functional configuration of an HMD in the fifth embodiment.

FIG. 22 is a functional block diagram of an HMD in the fifth embodiment. An image processing apparatus 103 is the same as those in the above-described embodiments, and is consequently not illustrated. In a further embodiment the HMD may comprise the image display unit 209 whilst the image processing apparatus 103 comprises all of the remaining functional units of the HMD 2401, as illustrated in FIG. 22. The image processing apparatus 103 thus has the aberration correction function. In such a case the HMD will comprise an image receiving interface for receiving corrected images from the image processing apparatus 103. Correspondingly the image processing apparatus 103 will have an image transmitting interface for transmitting the corrected images output by image adjusting unit 208 to the HMD.

An HMD 2401 according to the fifth embodiment includes an optical sensor 2402 (to be referred to as a sensor 2402) for automatically measuring the amount of color misregistration generated by a vision correction optical system.

The sensor 2402 includes a light source for illuminating a spectacle lens used by the HMD user, and an image sensor for receiving light transmitted through or reflected by the spectacle lens. The sensor 2402 executes measurement based on an instruction from an operation determining unit 211. The sensor 2402 selects only one correction table from aberration correction tables 224 stored in an aberration correction value storage unit 215 to appropriately correct an aberration.

The measurement method will be exemplified later. Many lens aberration measurement methods are known, and any of them is usable.

An image processing system having the above-mentioned arrangement can perform aberration correction appropriate for the user of the HMD 2401. The image processing system can obtain a proper display image of the HMD 2401 for each user, and allows any user of the HMD 2401 to correctly observe the display image.

By using measurement by the optical sensor, the fifth embodiment can automate obtainment of the amount of color misregistration in step S705 and aberration correction in step S706 in the flowchart of FIG. 7 in the first and second embodiments. Also, the fifth embodiment can automate processing in step S2101 (shown in detail in FIG. 20) of FIG. 19.

In this arrangement, a vision correction/non-correction determining unit (not shown) may be arranged to determine whether the HMD user uses a vision correction optical system (spectacle lens), as internal processing in step S701 of the flowchart in FIG. 7. The vision correction/non-correction determining unit is formed from, e.g., a light source and a light receiving unit for receiving light reflected by or transmitted through a spectacle lens. The determination may be made based on information that light transmitted through the eyeglass or spectacle lens is free from color misregistration or no light is reflected by the lens surface. When deflected light and a deflection camera are used, whether a lens exists can be determined using a characteristic of uniformly deflecting light transmitted through or reflected by a lens. An imaging technique utilizing deflection information is well known, and a determination may be made based on this technique. If it is determined as a result of determining correction/non-correction of vision that the HMD user does not use a vision correction optical system and observes with his naked eyes, aberration correction suffices to be performed for only the display optical system of the HMD without executing processes in step S702 and subsequent steps of FIG. 7. If it is determined that the HMD user corrects his vision, processes in step S702 and subsequent steps are executed to perform aberration correction for a combination of the display optical system of the HMD and the vision correction optical system.

Figure 23:
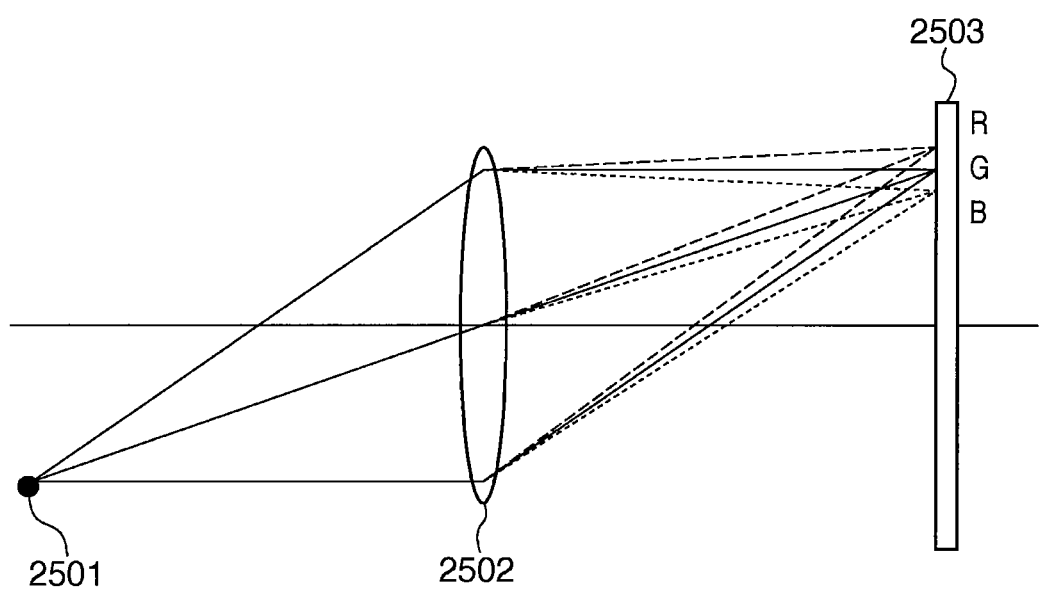
FIG. 23 is a schematic view for explaining an aberration measurement method in the fifth embodiment.

FIG. 23 is a schematic view for explaining the aberration measurement method in the fifth embodiment.

A point source 2501 is used to measure aberrations of a vision correction optical system. An optical system 2502 corresponds to a vision correction optical system (spectacle lens) used by the HMD user. An image sensor 2503 receives light which has been emitted by the point source 2501 and passed through the spectacle lens. Light emitted by the point source is imaged with color misregistration on the image sensor.

This arrangement can measure aberrations of a spectacle lens used by the HMD user.

The fifth embodiment measures aberrations using light having passed through a spectacle lens. Instead, aberrations may be measured using light reflected by the lens. When reflected light is used, light beams reflected by the two surfaces of the lens need to be measured to obtain the curvatures of the two surfaces of the lens. However, aberrations may be estimated simply based on the measurement result of only one surface. Aberrations may be measured at one or a plurality of measurement portions.

Note that the HMD 2401 may have this measurement function to measure aberrations while the HMD 2401 is mounted on the head of a user. It is also possible that the HMD 2401 has a spectacle lens-dedicated jig and aberrations of a spectacle lens are measured in advance using the jig before mounting the HMD.

The HMD 2401 requiring a smaller size and lighter weight is assumed to use a simple measurement function in order to suppress an increase in size upon mounting an automatic measurement function. In some cases, measurement using a simple measurement function cannot obtain high-precision aberration information, unlike a lens-meter, failing in high-precision aberration correction. The interval between the correction amounts of correction tables prepared in advance may be large, and a correction table whose correction amount truly matches the amount of color misregistration may not exist. Even in such a case, however, the arrangement of the HMD

2401 can achieve aberration correction and fine adjustment based on the amount of color misregistration observed by the pupil of the HMD user. Thus, the HMD 2401 can correct an aberration to fall within a range allowable by the HMD user.

As described above, the fifth embodiment adopts a function of measuring the amount of aberration generated by a vision correction optical system (mainly a spectacle lens) used by the HMD user. An appropriate correction table can be automatically selected. The fifth embodiment can further simplify a complicated operation by the HMD user, compared to the first to fourth embodiments.

In the first to fifth embodiments, an aberration generated by a combination of the display optical system of the HMD and a vision correction optical system used by the HMD user is calculated based on color misregistration observed by the HMD user or by measurement using an optical sensor. However, the present invention is not limited to them. For example, an aberration can be calculated based on a report of vision correction information (e.g., unaided vision and corrected vision, or the refractive index and curvature of a vision correction optical system (spectacle lens)) from the HMD user.

In the first to fifth embodiments, the colors of a pixel which forms the display device are the three, R, G, and B primary colors, but are not limited to them. However, a different color may require pre-processing such as a color conversion function complying with the color.

Two or more of the arrangements described in the first to fifth embodiments may also be combined.

In the first to fifth embodiments, aberration correction is mainly applied to an HMD employing an eyepiece enlargement optical system. However, an application of the present invention is not limited to this. For example, the same effects as those described above can also be attained when the present invention is applied to an EVF mounted in a digital single-lens camera, digital video camera, or the like.

It will readily occur to those skilled in the art that various techniques in the embodiments are properly combined to build a new system. Systems based on various combinations of the particular embodiments disclosed herein also fall within the scope of the present invention.

According to the above-described embodiments, aberration correction suited to each observer can be performed to present an aberration (color misregistration)-reduced display image in an image display apparatus having a display optical system which enlarges an image formed on a display device and allows an observer to observe it.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

US Only

This application claims the benefit of Japanese Patent Application No. 2008-265710, filed Oct. 14, 2008, which is hereby incorporated by reference herein in its entirety.

What is claimed is:

1. An image processing apparatus for determining observer-specific aberration correction data for correcting a color misregistration generated by a display optical system for allowing an observer to observe a display image formed on a display, comprising:
   a storage unit configured to store aberration correction data for correcting a color misregistration;
   an obtainment unit configured to obtain a degree of the color misregistration from a combination of the display optical system and a vision correction optical system of the observer;
   a determination unit configured to determine observer-specific aberration correction data for correcting the color misregistration based on the aberration correction data and the degree of the color misregistration obtained by said obtainment unit; and
   a correction unit configured to correct the color misregistration on the display image based on the observer-specific aberration correction data determined by the determination unit.

2. The apparatus according to claim 1, wherein said storage unit stores observer identification data in correspondence with the observer-specific aberration correction data determined by said determination unit or in correspondence with information designating the observer-specific correction data determined by said determination unit so that the determined observer-specific aberration correction data can be reused.

3. The apparatus according to claim 1, wherein
   said storage unit stores a plurality of types of aberration correction data having different correction amounts prepared in advance, and
   said determination unit selects one of the plurality of types of aberration correcting data based on the aberration information obtained by said obtainment unit, thereby determining observer-specific aberration correction data.

4. The apparatus according to claim 1, wherein said determination unit generates new observer-specific correction data using the aberration information obtained by said obtainment unit and the aberration correction data stored in said storage unit.

5. The apparatus according to claim 4, wherein
   said storage unit stores a plurality of types of aberration correction data having different correction amounts, and
   said determination unit selects at least two types of aberration correction data from the stored plurality of types of aberration correction data based on the aberration information obtained by said obtainment unit, and interpolates from the selected aberration correction data, thereby determining new observer-specific correction data.

6. The apparatus according to claim 1, wherein said determination unit determines observer-specific correction data corresponding to one of the observer's eyes and uses this observer-specific correction data to determine the observer-specific correction data for the observer's other eye.

7. The apparatus according to claim 1, further comprising an adjusting unit for adjusting the observer-specific correction data determined by said determination unit.

8. The apparatus according to claim 1, further comprising:
the display;
the optical system for allowing the observer to observe an image on the display; and
a first image generating unit for causing the display to display at least a first image.

9. The apparatus according to claim 8, wherein said obtainment unit obtains the aberration information from the observer representing an amount of color-separation of the first image when displayed on the display.

10. The apparatus according to claim 9, wherein said obtainment unit obtains aberration information based on an image shift amount required to superimpose at least one color separated image of the first image onto another color separated image of the first image.

11. The apparatus according to claim 1, further comprising an optical sensor for automatically obtaining aberration information relating to a vision correction optical system worn by the observer,
wherein said obtainment unit obtains the aberration information of the vision correction optical system from said optical sensor.

12. The apparatus according to claim 1, wherein said obtainment unit further comprising:
a light source configured to illuminate a vision correction optical system with light;
a light reception unit configured to receive light reflected by or transmitted through the vision correction optical system; and
a decision unit configured to decide whether or not the vision correction optical system exists, based on a light receiving state of said light receive unit,
wherein said obtainment unit obtains the aberration correction data of the vision correction optical system when said decision unit decides that the vision correction optical system exists.

13. A method of determining observer-specific aberration correction data for correcting a color misregistration generated by a display optical system for allowing an observer to observe a display image formed on a display, the method comprising the steps of:
obtaining degree of the color misregistration by a combination of the display optical system and a vision correction optical system of the observer;
determining observer-specific aberration correction data for correcting the color misregistration based on the aberration correction data and the degree of the color misregistration obtained in the obtaining step; and
correcting the color misregistration on the display image based on the observer-specific aberration correction data determined in the determining step.

14. A non-transitory computer-readable storage medium storing a program which on execution by a computer causes an image processing apparatus, which determines observer-specific aberration correction data for correcting a color misregistration generated by a display optical system for allowing an observer to observe a display image formed on a display, to perform the steps of:
obtaining degree of the color misregistration by a combination of the display optical system and a vision correction optical system of the observer; and
determining observer-specific aberration correction data for correcting the color misregistration based on the aberration correction data and the degree of the color misregistration obtained in the obtaining step; and
correcting the color misregistration on the display image based on the observer-specific aberration correction data determined in the determining step.

15. An image processing apparatus for correcting a color misregistration generated by a display optical system for allowing an observer to observe a display image formed on a display, the image processing apparatus comprising:
a storage unit storing aberration correction data which corrects for a color misregistration caused by a combination of the display optical system and a vision optical correction system of the observer; and
a correcting unit for correcting an image for display using the stored aberration correction data.

16. A method for correcting a color misregistration generated by a display optical system for allowing an observer to observe a display image formed on a display, the image processing method comprising the steps of:
retrieving stored aberration correction data which corrects for a color misregistration caused by a combination of the display optical system and a vision correction optical system worn by the observer; and
correcting an image for display using the retrieved aberration correction data.

17. An image processing system comprising an image display apparatus which allows an observer to observe a display image displayed on a display via a display optical system, and an image processing apparatus which corrects a color misregistration generated by the display optical system, said image processing apparatus comprising:
a storage unit configured to store correction data prepared in advance to correct a color misregistration generated by the display optical system;
an obtainment unit configured to obtain degree of color misregistration by a combination of the display optical system and a vision correction optical system used by the observer who observes the display image;
a determination unit configured to determine, based on the correction data prepared in advance and the degree of color misregistration obtained by said obtainment unit, observer-specific aberration correction data for correcting an aberration which exists in an optical path extending from the display to the observer; and
a correction unit configured to correct the color misregistration on a further display image based on the observer-specific aberration correction data determined by said determination unit,
wherein said image display apparatus inputs a further display image corrected by said correction unit and displays the display image on the display.

18. An image processing apparatus for determining observer specific aberration correction data for correcting an aberration generated by a display optical system for allowing an observer to observe a display image formed on a display, comprising:
a storage unit configured to store aberration correction data for correcting color misregistration;
a display unit configured to display a pattern on a peripheral region in the display;
an obtaining unit configured to obtain a degree of color misregistration of the display optical system based on the displayed pattern;
a determination unit configured to determine observer-specific aberration correction data for correcting the color misregistration based on the aberration correction data and the degree of color misregistration obtained by said obtain unit; and a correction unit to configured to correct the color misregistration on the display image based on the observer-specific aberration correction data determined by the determination unit.

19. The image processing apparatus according to claim 18, wherein the pattern is a cross line.

20. The image processing apparatus according to claim 18, wherein the display unit displays the pattern on each corner region of the display.

21. The image processing apparatus according to claim 18, wherein obtaining unit obtains as the degree of color misregistration, a shift amount required to superimpose at least one color separated pattern of the pattern onto another color separated pattern of the pattern,
wherein the pattern is separated into the color separated patterns on the display due to the color misregistration.

22. An image processing apparatus for determining observer-specific aberration correction data for correcting a color misregistration generated by an optical system for allowing an observer to observe a display image formed on a display, comprising:
a storage unit storing aberration correction data for correcting a color misregistration;
an obtaining unit configured to obtain information with respect to a vision correction optical system of the observer;
a determination unit configured to determine observer-specific aberration correction data for correcting the color misregistration based on the aberration correction data and the information with respect to the vision correction optical system of the observer; and
a correction unit configured to correct the color misregistration on the display image based on the observer-specific aberration correction data determined by the determination unit.

23. The apparatus according to claim 22, wherein the information with respect to the vision correction optical system of the observer includes at least one of information of an unaided vision and corrected vision, a refractive index and curvature of the vision correction optical system.

24. The apparatus according to claim 22, wherein the vision correction optical system is a spectacle lens.

25. The apparatus according to claim 22, wherein the obtaining unit obtains the information with respect to a vision correction optical system of the observer.

26. An image processing apparatus for determining observer-specific aberration correction data for correcting a color misregistration generated by an optical system for allowing an observer to observe a display image formed on a display, comprising:
a storage unit storing aberration correction data for correcting a color misregistration;
an obtain unit configured to obtain information of the color misregistration by the display optical system;
a determination unit configured to determine observer-specific aberration correction data for correcting the color misregistration based on the aberration correction data and the information of the color misregistration obtained by said obtain unit ;and
a correction unit to configured to correct the color misregistration on the display image based on the observer-specific aberration correction data determined by the determination unit.

27. An image processing method of determining observer-specific aberration correction data for correcting a color misregistration generated by an optical system for allowing an observer to observe a display image formed on a display, comprising:
an obtaining step of obtaining aberration correction data for correcting a color misregistration and information with respect to a vision correction optical system of the observer;
a determination step of determining observer-specific aberration correction data for correcting the color misregistration based on the aberration correction data and the information with respect to the vision correction optical system of the observer; and
a correction step of correcting the color misregistration on the display image based on the observer-specific aberration correction data determined in the determination step.

28. An image processing method of determining observer-specific aberration correction data for correcting a color misregistration generated by an optical system for allowing an observer to observe a display image formed on a display, comprising:
an obtain step of obtaining aberration correction data for correcting a color misregistration and information of the color misregistration by the display optical system;
a determination step of determining observer-specific aberration correction data for correcting the color misregistration based on the aberration correction data and the information of the color misregistration obtained in the obtaining step; and
a correction step of correcting the color misregistration on the display image based on the observer-specific aberration correction data determined in the determination step.

29. A non-transitory computer readable storage medium storing a program which on execution by a computer causes an image processing apparatus, which determines observer-specific aberration correction data for correcting a color misregistration generated by an optical system for allowing an observer to observe a display image formed on a display, to:
obtain aberration correction data for correcting a color misregistration and information with respect to a vision correction optical system of the observer;
determine observer-specific aberration correction data for correcting the color misregistration based on the aberration correction data and the information with respect to the vision correction optical system of the observer; and
correct the color misregistration on the display image based on the observer- specific aberration correction data.

30. A non-transitory computer readable storage medium storing a program which on execution by a computer causes an image processing apparatus, which determines observer-specific aberration correction data for correcting a color misregistration generated by an optical system for allowing an observer to observe a display image formed on a display, to:
obtain aberration correction data for correcting a color misregistration and information of the color misregistration by the display optical system;
determine observer-specific aberration correction data for correcting the color misregistration based on the aberration correction data and the information of the color misregistration; and
correct the color misregistration on the display image based on the observer- specific aberration correction data.

* * * * *